US012219532B2

(12) United States Patent
Selvanesan et al.

(10) Patent No.: US 12,219,532 B2
(45) Date of Patent: Feb. 4, 2025

(54) V2X DYNAMIC GROUPCAST RESOURCE ALLOCATION

(71) Applicant: Fraunhofer-Gesellschaft zur Förderung der angewandten Forschung e.V., Munich (DE)

(72) Inventors: Sarun Selvanesan, Berlin (DE); Thomas Fehrenbach, Berlin (DE); Cornelius Hellge, Berlin (DE); Thomas Wirth, Berlin (DE); Thomas Schierl, Berlin (DE); Robin Thomas, Berlin (DE); Baris Göktepe, Berlin (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

(21) Appl. No.: 18/507,364

(22) Filed: Nov. 13, 2023

(65) Prior Publication Data

US 2024/0098705 A1     Mar. 21, 2024

Related U.S. Application Data

(63) Continuation of application No. 17/249,902, filed on Mar. 18, 2021, now Pat. No. 11,864,163, which is a
(Continued)

(30) Foreign Application Priority Data

Sep. 26, 2018 (EP) .................................. 18197008
Oct. 31, 2018 (EP) .................................. 18203842

(51) Int. Cl.
*H04W 72/04* (2023.01)
*H04W 4/08* (2009.01)
(Continued)

(52) U.S. Cl.
CPC ............. *H04W 72/04* (2013.01); *H04W 4/08* (2013.01); *H04W 4/40* (2018.02); *H04W 92/18* (2013.01)

(58) Field of Classification Search
CPC ......... H04W 72/04; H04W 4/40; H04W 4/08; H04W 92/18; H04W 72/02;
(Continued)

(56) References Cited

U.S. PATENT DOCUMENTS 10,397,900 B2  8/2019  Adachi
10,575,283 B2  2/2020  Tang
(Continued)

FOREIGN PATENT DOCUMENTS

CN    104822141 A    8/2015
CN    104954976 A    9/2015
(Continued)

OTHER PUBLICATIONS

Non-Final Office Action dated May 25, 2023, issued in U.S. Appl. No. 17/210,002.
(Continued)

*Primary Examiner* — Rushil P. Sampat
(74) *Attorney, Agent, or Firm* — McClure, Qualey & Rodack, LLP

(57) ABSTRACT

An apparatus for a wireless communication system is describes. The wireless communication system includes one or more base stations and a plurality of user devices, UEs. The apparatus is configured to be connected to one or more UEs via a sidelink for a sidelink communication with the one or more UEs, the apparatus and the one or more UEs forming a group of UEs and using a set of group resources to be used for the sidelink communication within the group of UEs. In case a base station does not provide resource allocation configuration or assistance, the apparatus is con-
(Continued)

figured to select resources from a set of resources provided by the wireless communication system so as to alter or completely change the set of group resources to be used for the sidelink communication within the group of UEs.

16 Claims, 11 Drawing Sheets

Related U.S. Application Data continuation of application No. PCT/EP2019/075353, filed on Sep. 20, 2019.

(51) Int. Cl.
  *H04W 4/40* (2018.01)
  *H04W 92/18* (2009.01)
(58) Field of Classification Search
  CPC ......... H04W 72/0446; H04W 72/0453; H04W 72/10; H04W 72/56; H04W 74/0808; H04B 17/318
  See application file for complete search history.

(56) References Cited

U.S. PATENT DOCUMENTS

| | | | |
|---|---|---|---|
| 10,986,610 | B2 | 4/2021 | Kim |
| 2014/0094183 | A1 | 4/2014 | Gao et al. |
| 2015/0215760 | A1 | 7/2015 | Wei et al. |
| 2016/0234754 | A1 | 8/2016 | Baghel |
| 2016/0330728 | A1 | 11/2016 | Sorrentino et al. |
| 2016/0353416 | A1 | 12/2016 | Takano |
| 2017/0245245 | A1 | 8/2017 | Kim |
| 2017/0257876 | A1 | 9/2017 | Loehr et al. |
| 2018/0020432 | A1 | 1/2018 | Rico Alvarino |
| 2019/0082421 | A1* | 3/2019 | Sartori ............... H04W 48/16 |
| 2019/0253919 | A1 | 8/2019 | Wu |
| 2019/0254062 | A1 | 8/2019 | Wu |
| 2019/0268918 | A1 | 8/2019 | Baghel |
| 2019/0274121 | A1 | 9/2019 | Wu |
| 2019/0372739 | A1 | 12/2019 | Li et al. |
| 2019/0380142 | A1 | 12/2019 | Wang |
| 2020/0029318 | A1 | 1/2020 | Guo |
| 2020/0045719 | A1* | 2/2020 | Wang ............... H04W 72/566 |
| 2020/0052829 | A1 | 2/2020 | Bendlin |
| 2020/0053524 | A1 | 2/2020 | Novlan |
| 2020/0092685 | A1 | 3/2020 | Fehrenbach |
| 2020/0178217 | A1* | 6/2020 | Huang ............... H04W 76/27 |
| 2020/0221423 | A1* | 7/2020 | Wang ............... H04W 72/02 |
| 2021/0068125 | A1* | 3/2021 | Lin ............... H04W 76/14 |
| 2021/0211845 | A1 | 7/2021 | Lin |

FOREIGN PATENT DOCUMENTS

| | | |
|---|---|---|
| CN | 106304351 A | 1/2017 |
| CN | 107079530 A | 8/2017 |
| CN | 107211470 A | 9/2017 |
| EP | 3 206 452 A1 | 8/2017 |
| JP | 2018-509072 A | 3/2018 |
| WO | 2015/032436 A1 | 3/2015 |
| WO | 2015/046155 A1 | 4/2015 |
| WO | 2016/045094 A1 | 3/2016 |
| WO | 2017/026463 A1 | 2/2017 |
| WO | 2017/185369 A1 | 11/2017 |
| WO | 2018124776 A1 | 7/2018 |
| WO | WO 2018/201415 A1 * | 11/2018 |
| WO | WO 2019/031926 A1 * | 2/2019 |
| WO | 2020/030688 A1 | 2/2020 |
| WO | 2020/064555 A1 | 4/2020 |

OTHER PUBLICATIONS

U.S. Appl. No. 62/696,589, filed 2018.
International Search Report and Written Opinion dated Jan. 28, 2020, issued in application No. PCT/EP2019/075353.
3GPP TS 23.303;"Proximity-based services (ProSe); Stage 2 (Release 15);" V15.1.0, Jun. 2018; pp. 1-130.
3GPP TR 22.886 V16.0.0; "3rd Generation Partnership Project; Technical Specification Group Services and System Aspects; Study on enhancement of 3GPP Support for 5G V2X Services (Release 16);" Jun. 2018; pp. 1-67.
Ericsson; "On Procedures for In/Out of NW coverage detection for D2D;" 3GPP Draft; RI-140780 out of Coverage Procedures Final, 3rd Generation Partnership Project (3GPP); vol. RAN WG1, No. 76; Jan. 2014; XP050751735, Retrieved from the Internet: URL:http://www.3gpp.org/ftp/tsg_ran/WG1_RL1/TSGR1_76/Docs/ pp. 1-6.
Nokia et al; "D2D Communication without network coverage"; 3GPP Draft; R1-134535, 3rd Generation Partnership Project (3GPP); vol. RAN WGI, No. 74bis; Sep. 2013; XP050717638, Retrieved from the Internet: URL:http://www.3gpp.org/ftp/tsg_ran/WG1_RL1/TSGR1_ 74b/Docs/ ; pp. 1-6.
Intel Corporation; "Resource allocation for D2D communication"; 3GPP Draft; R2-140312 Final, 3rd 30-33, Generation Partnership Project (3GPP); vol. RAN WG2, No. 85; Feb. 2014; XP050791705, Retrieved from the Internet: URL:http://www.3gpp.org/ftp/Meetings_3GPP_SYNC/RAN2/Docs/; pp. 1-5.
Fraunhofer Hhi et al; "Resource Pool Sharing between Mode 3 and Mode 4 UEs;" 3GPP Draft; R2-1805403 Mode3mode4resourcesharing, 3rd Generation-Partnership Project (3GPP); vol. RAN WG2, No. 101nis; Apr. 2018 (Apr. 14, 2018), XP051429067, Retrieved from the Internet: URL:http://www.3gpp.org/ftp/Meetings%5F3GPP%5FSYNC/RAN2/Docs/; pp. 1-6.
Fraunhofer Hhi et al; "Enhancements for NR V2X Resource Allocation Mechanism;" 3GPP Draft; R1-1808309 V2X RA, 3rd Generation Partnership-Project (3GPP); vol. 94; Aug. 2018 (Aug. 10, 2018), XP051515692, Retrieved from the Internet: URL:http://www.3gpp.org/ftp/tsg%5Fran/WG1%5FRL1/TSGR1%5F94/Docs/R1%2D1808309%2Ezip; pp. 1-4.
4mo Office Action dated May 15, 2023, issued in European application No. EP 19769531.5.
Kyocera; "Resource allocation schemes for D2D communication;" 3GPP Draft; #GPP TSG-RAN WG2 #84; Nov. 2013; pp. 1-11.
Korean language office action dated 2024-04-15, issued in application No. KR 10-2021-7012464.
English language translation of office action dated Apr. 15, 2024 (pp. 1-7 of attachment).
Chinese language office action dated Jan. 21, 2022, issued in application No. CN 201980078010.8.
English language counterpart to office action Jan. 21, dated 2022, issued in application No. CN 201980078010.8.
AT&T; "Resource allocation mechanism in NR V2X;" 3GPP TSG RAN WG1 Meeting #94 R1-1809069; Aug. 2018; pp. 1-5.
Lenovo; "Resource allocation mechanism in NR V2X;" 3GPP TSG RAN WG1 Meeting #94 R1-1808556; Aug. 2018; pp. 1-2.
NTT Docomo, Inc.; "Resource allocation mechanism;" 3GPP TSG RAN WG1 Meeting #94 R1-1809159; Aug. 2018; pp. 1-7.
Chinese language office action dated Jan. 9, 2024, issued in application No. CN 201980077568.4.
Final Office Action dated Jan. 5, 2024, issued in U.S. Appl. No. 17/210,002.
Japanese language office action dated Jun. 28, 2022, issued in application No. JP 2021-517220.
English language translation of office action dated Jun. 28, 2022, issued in application No. JP 2021-517220 (pp. 1-13 of attachment).
Samsung; "Discussion on resource allocation mechanisms for NR V2X;" 3GPP TSG RAN WG1 #94 R1-1808778; Aug. 2018; pp. 1-8.
Ericsson; "Radio Resource Management for NR Sidelink Communication;" GPP TSG RAN WG1 #94 R1-1809304; Aug. 2018; pp. 1-8.
Chinese language office action dated Sep. 20, 2024, issued in application No. CN 201980077568.4.

* cited by examiner

*GroupcastResources* information element

```
- - ASN1START
GroupResourceReservation : : =  SEQUENCE {
    Group - ID
    Group - HV - UE - ID
    sl - SubframeRef - r15    INTEGER  (0. . 10239) ,→   across time
    sensingResult - r15   SEQUQNCE  (SIZE (0. .400) ) OF SensingResult - r15
}

SensingResult - r15 : : =  SEQUENCE {
    resourceIndex - 15    INTEGER  (SIZE (1 . .2000) ) → across frequency
}
- -ASN1STOP
```

Fig. 8

V2X DYNAMIC GROUPCAST RESOURCE ALLOCATION

CROSS-REFERENCE TO RELATED APPLICATIONS

This application is a continuation of U.S. application Ser. No. 17/249,902, now issued as Patent (U.S. Pat. No. 11,864, 163 B2), filed Mar. 18, 2021, which is incorporated herein by reference in its entirety which in turn is a continuation of International Application No. PCT/EP2019/075353, filed Sep. 20, 2019, which is incorporated herein by reference in its entirety, and additionally claims priority from European Applications Nos. EP 18197008.8, filed Sep. 26, 2018 and 18203842.2, filed Oct. 31, 2018, which are all incorporated herein by reference in their entirety.

TECHNICAL FIELD

The present application relates to the field of wireless communication systems or networks, more specifically to approaches for a wireless communication among user devices of a wireless communication system using a sidelink communication, like a V2X communication. Embodiments concern groups of user devices communicating with each other over the sidelink interface, for example for a group V2X communication, and a dynamic groupcast resource allocation for such groups of user devices, for example, in cases a base station does not support or stops providing resource allocation configuration or assistance for a group of user devices. Other embodiments concern a group of user devices having a leader UE establishing respective links within the group of UEs using the RRC protocol on the sidelink.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network RAND that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RAND may include more or less such cells, and RAND may also include only one base station. FIG. 1(b) shows two users $UE_1$ and $UE_2$, also referred to as user equipment, $UE_1$ that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs
- may be connected to the base station, that may not support NR V2X services, e.g. GSM, UMTS, LTE base stations.

When considering two UEs directly communicating with each other over the sidelink, e.g. PC5, one of the UEs may also be connected with a BS, and may relay information from the BS to the other UE via the sidelink interface. The relaying may be performed in the same frequency band (in-band-relay) or using another frequency band (out-of-band relay). In the first case, communication on the Uu and on the sidelink may be decoupled using different time slots as in time division duplex (TDD) systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 4 UEs are outside of the coverage 200 of a base station, rather, it means that the respective mode 4 UEs are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the mode 3 UEs 202, 204 also mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. Within the wireless communication network or within a cell thereof, a plurality of such groups may exist at the same time. While it is noted that the communication within the group is via sidelink communication, in case the group or at least some group members thereof are in-coverage, this does not exclude that also some or all of the group members communicate with other entities outside the group via the base station or via the sidelink. For example, the above-described scenarios using vehicular user devices may be employed in the field of the transport industry in which a plurality of vehicles being equipped with vehicular user devices may be grouped together, for example, by a remote driving application.

Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

When grouping respective user devices together for a sidelink communication among each other one of the UEs may operate as a so-called UE leader, like a host vehicle, HV, UE, which could also be referred to as a group leader UE or UE manager, in case of vehicular applications. The leader UE may be used for controlling or organizing the communication within the group among the respective group UEs via the sidelink, and for this, the leader UE may obtain a set of resources that is to be used within the group for the group internal communication, also referred to as a groupcast communication. Such set of resources to be used for the groupcast communication may be referred as a mini resource pool which is formed of a plurality of resources selected from available resources for a communication among user devices in the wireless communication network. Examples for providing such resource pools are described in the applicant's European patent applications EP 18 197 008.8, "Resource Pool Design for Group Communications", filed on Sep. 26, 2018, and EP 18 188 370.3, "NR V2X Resource Pool Design", filed on Aug. 9, 2018, both of which are incorporated herewith by reference.

It is noted that the information in the above section is only for enhancing the understanding of the background of the invention and therefore it may contain information that does not form conventional technology that is already known to a person of ordinary skill in the art.

Starting from conventional technology as described above, when considering the above scenarios and, more generally, a wireless communication system in which a plurality of users may be grouped together so as to provide for a communication among the group members of a group having a group leader, there may be a need for an improved approach for obtaining resources to be used for the group communication in situations in which the base station does not or stops providing resource allocation configuration or assistance for a group of user devices.

SUMMARY

An embodiment may have an apparatus for a wireless communication system, the wireless communication system having one or more base stations and a plurality of user devices, UEs, wherein the apparatus is configured to be connected to one or more UEs via a sidelink for a sidelink communication with the one or more UEs, the apparatus and the one or more UEs forming a group of UEs and using a set of group resources to be used for the sidelink communication within the group of UEs, wherein, in case a base station does not provide resource allocation configuration or assistance, the apparatus is configured to select resources from a set of resources provided by the wireless communication system so as to alter or completely change the set of group resources to be used for the sidelink communication within the group of UEs, wherein, to select from the set of resources the resources to be used for the sidelink communication within the group of UEs, the apparatus is configured to carry out a sensing procedure and/or listening to announcements indicative of resources used by other UEs, wherein the one or more UEs forming with the apparatus the group of UEs do not sense or select the set of group resources for the sidelink communication within the group of UEs but receive information about the set of group resources from the apparatus, and wherein the apparatus is configured to announce the sensed or selected resources to all group UEs.

According to another embodiment, a wireless communication network may have: one or more base stations, and one or more apparatuses for a wireless communication system, the wireless communication system having one or more base stations and a plurality of user devices, UEs, wherein the apparatus is configured to be connected to one or more UEs via a sidelink for a sidelink communication with the one or more UEs, the apparatus and the one or more UEs forming a group of UEs and using a set of group resources to be used for the sidelink communication within the group of UEs, wherein, in case a base station does not provide resource allocation configuration or assistance, the apparatus is configured to select resources from a set of resources provided by the wireless communication system so as to alter or completely change the set of group resources to be used for the sidelink communication within the group of UEs, wherein, to select from the set of resources the resources to be used for the sidelink communication within the group of UEs, the apparatus is configured to carry out a sensing procedure and/or listening to announcements indicative of resources used by other UEs, wherein the one or more UEs forming with the apparatus the group of UEs do not sense or select the set of group resources for the sidelink communication within the group of UEs but receive information about the set of group resources from the apparatus, and wherein the apparatus is configured to announce the sensed or selected resources to all group UEs.

According to another embodiment, a method for operating an apparatus of a wireless communication system having one or more base stations and a plurality of user devices, UEs, the apparatus connected to one or more UEs via a sidelink for a sidelink communication with the one or more UEs, the apparatus and the one or more UEs forming a group of UEs and using a set of group resources to be used for the sidelink communication within the group of UEs, may have the steps of: in case a base station does not provide resource allocation configuration or assistance, selecting, by the apparatus, resources from a set of resources provided by the wireless communication system so as to alter or completely change the set of group resources to be used for the sidelink communication within the group of UEs, wherein, for selecting from the set of resources the resources to be used for the sidelink communication within the group of UEs, carrying out, by the apparatus, a sensing procedure and/or listening, by the apparatus, to announcements indicative of resources used by other UEs, wherein the one or more UEs forming with the apparatus the group of UEs do not sense or select the set of group resources for the sidelink communication within the group of UEs but receive information about the set of group resources from the apparatus, and wherein the apparatus announces the sensed or selected resources to all group UEs.

Still another embodiment may have a non-transitory digital storage medium having a computer program stored thereon to perform, when said computer program is run by a computer, the above inventive method for operating an apparatus of a wireless communication system.

BRIEF DESCRIPTION OF THE DRAWINGS

Embodiments of the present invention will be detailed subsequently referring to the appended drawings, in which:

FIG. 8 illustrates an embodiment of a resource reservation announcement message as it may be sent out by the leader UE;

DETAILED DESCRIPTION OF THE INVENTION

Embodiments of the present invention is now described in more detail with reference to the accompanying drawings in which the same or similar elements have the same reference signs assigned.

The initial vehicle-to-everything (V2X) specification was included in LTE Release 14 of the 3GPP standard. The scheduling and assignment of resources had been modified according to the V2X requirements, while the original device-to-device (D2D) communication standard has been used as a basis of the design. Cellular V2X has been agreed to operate in two configurations from a resource allocation perspective, namely in the above-described mode 3 and mode 4 configurations. As mentioned above, in the V2X mode 3 configuration the scheduling and interference management of resources is performed by the base station for UEs so as to enable sidelink, SL, communications, like vehicle-to-vehicle communications. The control signaling is provided to the UE over the Uu interface, for example using the downlink control indicator, DCI, and is dynamically assigned by the base station. In the V2X mode 4 configuration the scheduling and interference management for SL communications is autonomously performed using distributed or decentralized algorithms among the UEs based on a preconfigured resource configuration. As is described above, there are different scenarios or use cases in which a communication among the group members is desired, which is also referred to as a groupcast communication. Such groupcast communications entail that the members of the group are able to communicate with each other over shorter distances, while maintaining a high level of reliability and low latency. Examples of the mentioned use cases are vehicle platooning, extended sensors, advanced driving and remote driving.

Conventionally, when a base station provides resource allocation configuration/assistance to UEs, every member of the group or platoon has to request the base station for resources based on the amount of data the member UE would like to transmit. The base station then grants to the member of the group a set of resources to be used. Although this guarantees reliability to a certain degree, this approach is disadvantageous as it takes up a considerable amount of roundtrip time for short range communication between the group members and also results in large signaling overhead for the request for sidelink transmission resources for respective UEs within a group. Also, it may lead to a degraded communication performance when the group competes for resources with other UEs not part of the group. Furthermore, for sidelink communication, continuous processing of a very large system bandwidth is a challenge.

Figure 1A:
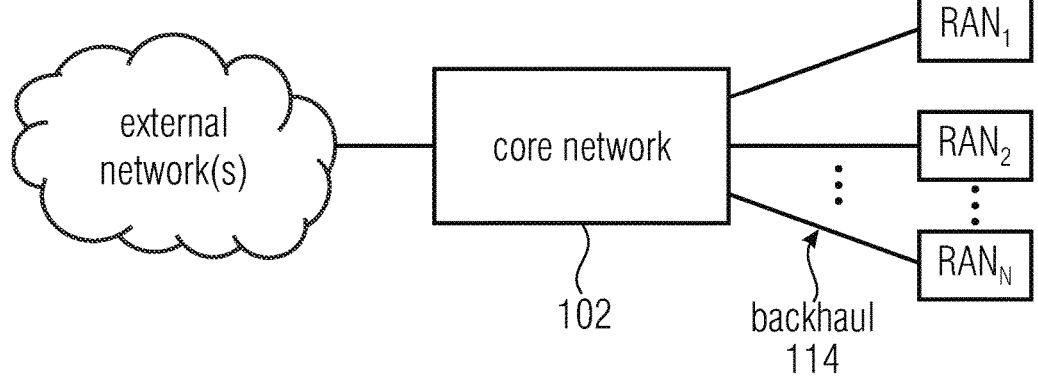
FIG. 1(a) shows a schematic representation of an example of a wireless communication system.
Figure 1B:
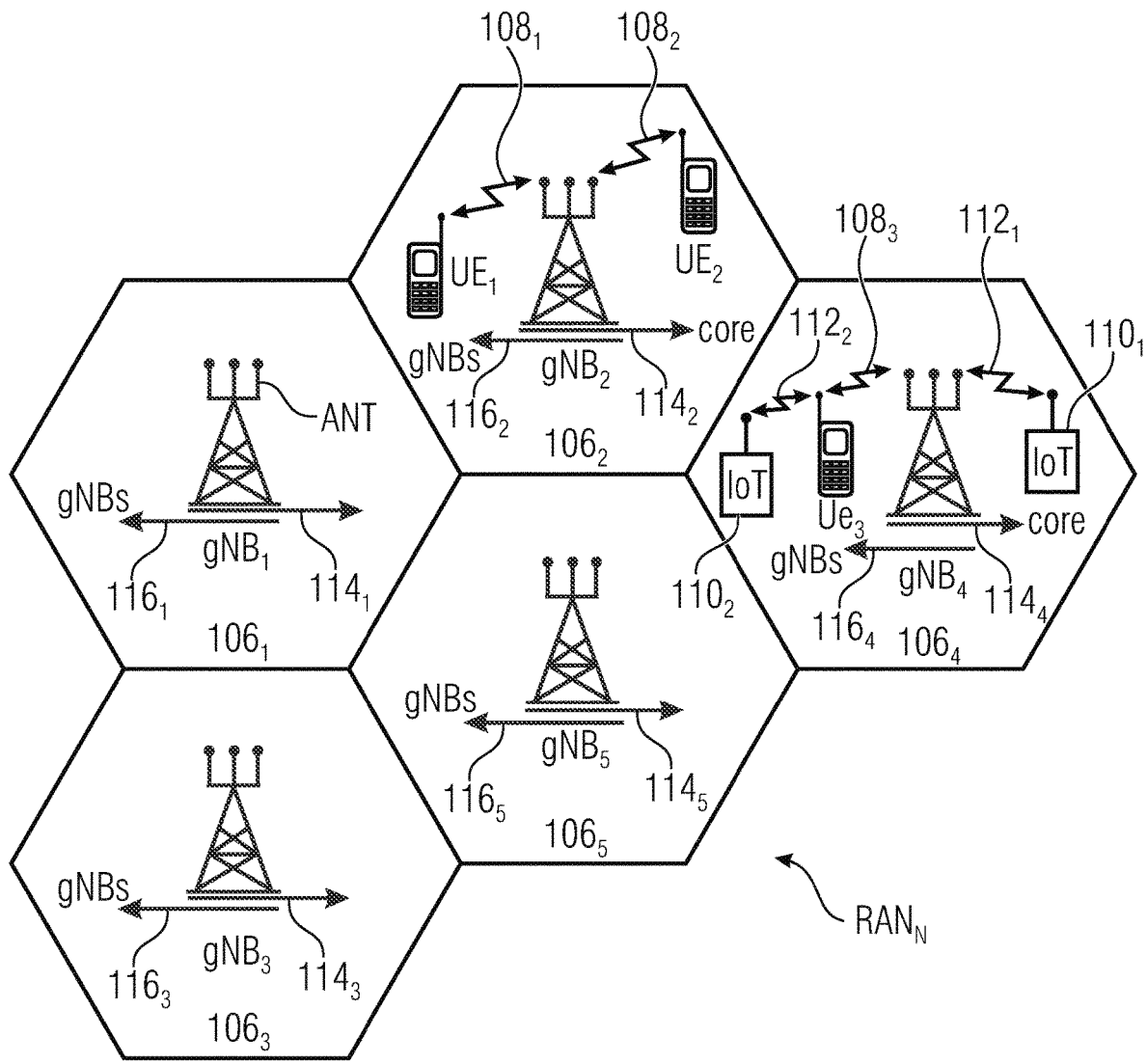
FIG. 1(b) is a schematic representation of an example of a radio access network $RAN_n$ that may include one or more base stations.
Figure 2:
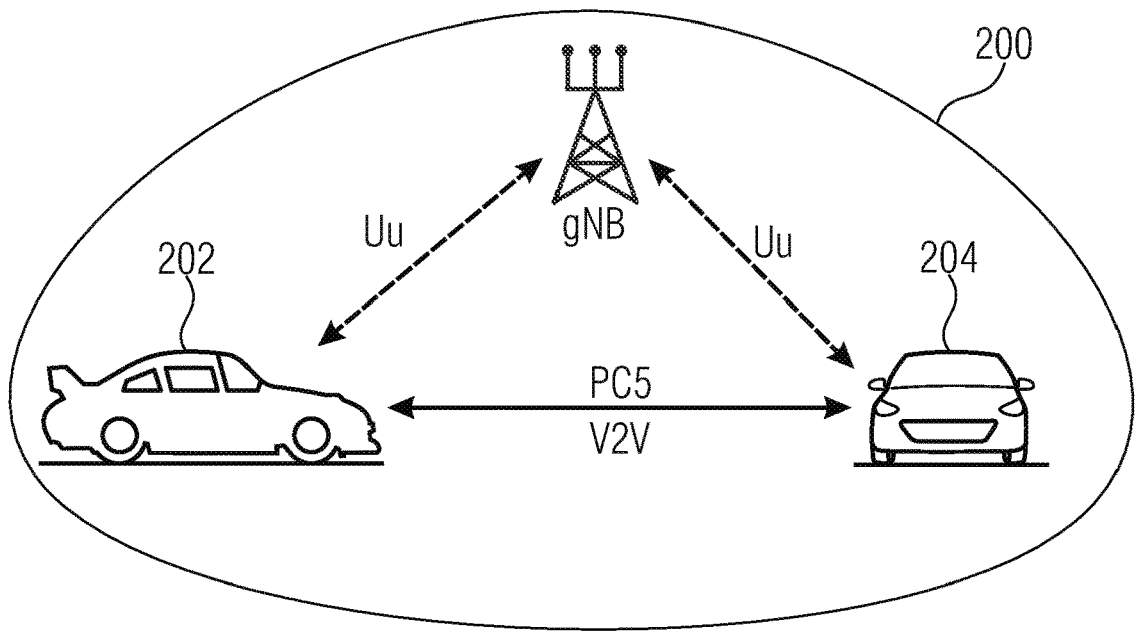
FIG. 2 is a schematic representation of an in-coverage scenario in which UEs directly communicating with each other are connected to a base station.
Figure 3:
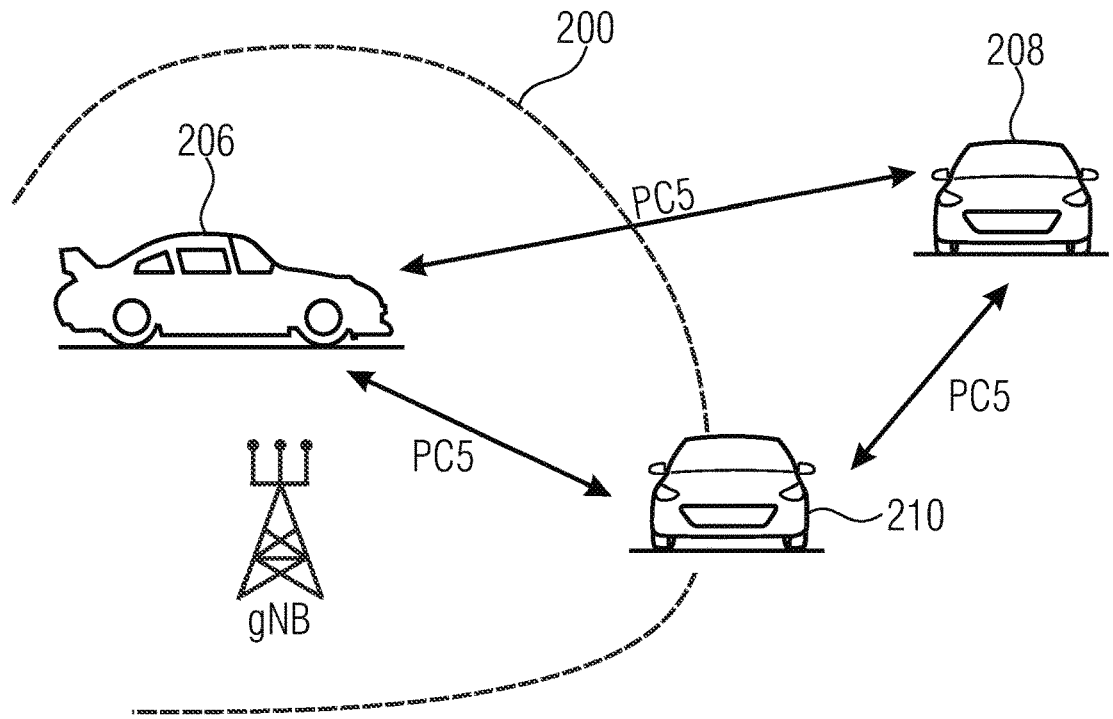
FIG. 3 is a schematic representation of an out-of-coverage scenario in which UEs directly communicating with each other receive no SL resource allocation configuration or assistance from a base station.
Figure 4:
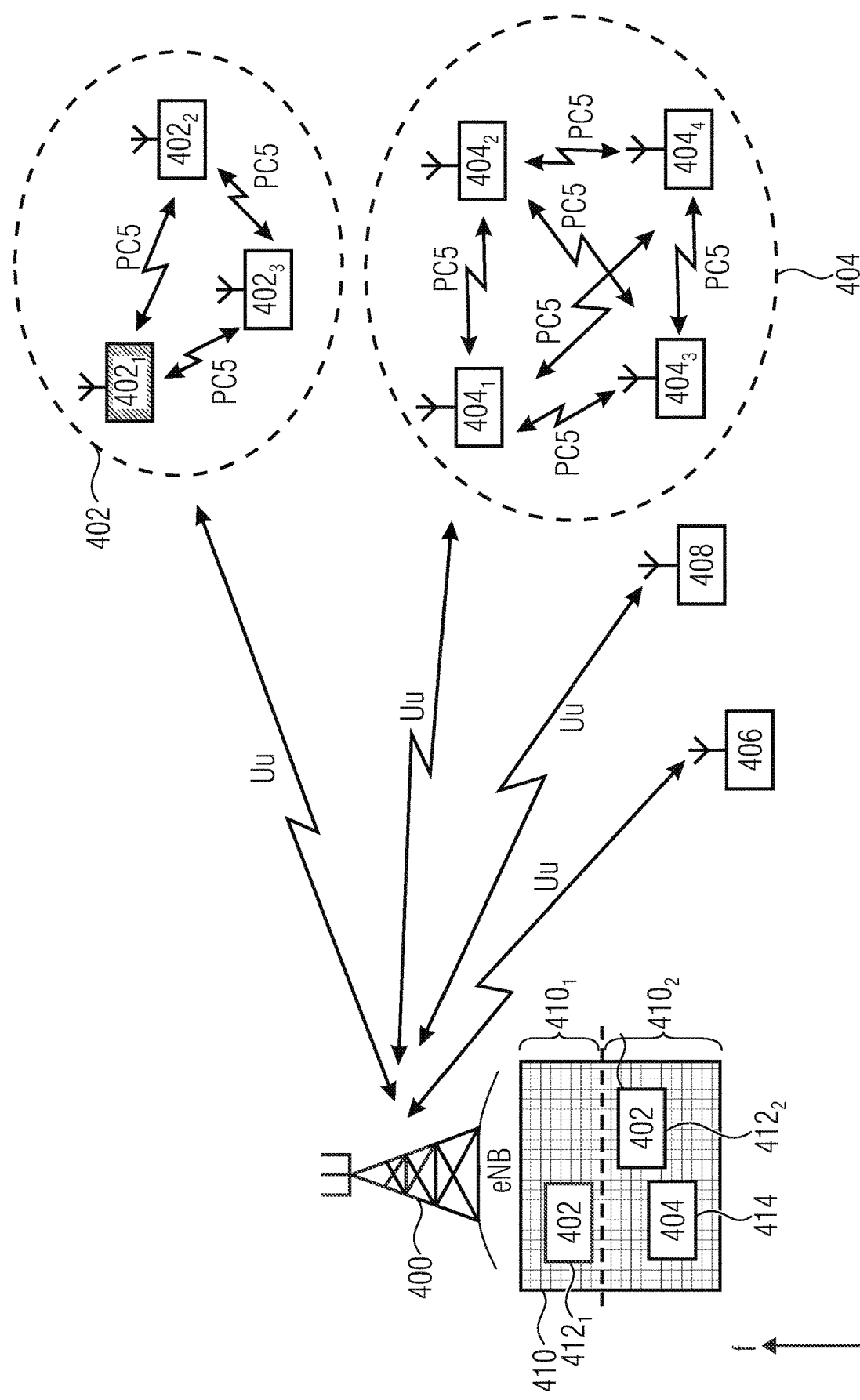
FIG. 4 is a schematic representation of a part of the wireless communication network, like the one of FIG. 1, for describing the concept of providing a set of resources to be exclusively used for a groupcast communication.

FIG. 4 is a schematic representation of a part of the wireless communication network, like the one described with reference to FIG. 1, and illustrates a cell of the network mentioned above or one of a plurality of radio access networks available in such a wireless communication network. FIG. 4 illustrates a base station 400 and a plurality of user devices, UEs. Some of the UEs are grouped into respective user device groups 402 and 404, while other UEs, like UEs 406 and 408 are not members of any group. The first group 402 includes, in accordance with the depicted example, three UEs $402_1$ to $402_3$, and within the group 402, the UEs $402_1$ to $402_3$ may communicate with each other using a sidelink interface, like the PC5 interface. The group 404 includes four UEs $404_1$ to $404_4$ which, like the UEs in the first group 402 communicate among each other using the sidelink communications via the sidelink interface, like the PC5 interface. The UEs within groups 402, 404 and the UEs 406, 408 may further communicate directly with the base station 400 using, for example, the Uu interface. Within the respective groups 402, 404, one of the UEs, some of the UEs or all of the UEs may communicate directly with the base station 400, however, for a communication with a group member a sidelink communication is employed.

For the communication a set of resources or a mini resource pool 410 is provided from which resources may be allocated to the respective UEs within groups 402, 404 and the UEs 406, 408 for transmitting data. For example, the resources or the resource pool 410 available include a time/frequency/space resource grid, and the base station 400 may determine from the resources 410 at least one set of resources, also referred to as a group resource pool, a resource pool, a mini resource pool or a sub-pool, from which resources are selected by the base station 400 (for UEs in NR mode 1) or by the UEs (for UEs in NR mode 2) for allocation to the respective groups 402, 404 for a communication among the group members over the sidelink interface. In the example of FIG. 4, the base station 400 provides for the first group 402 two sets of resources or two mini resource pools $412_1$ and $412_2$ which include the resources from the overall resource pool 410 to be used for the sidelink communication within the group 402. For the second group 404, the base station 400 provides a second resource pool 414. It is noted that the present invention is not limited to the depicted embodiment, rather, there may be only a single group of UEs or there may be more than the two depicted groups. Also, the number of UEs forming the group is not limited to the depicted embodiments, rather, any number of UEs may be grouped together. Also, there may be situations in which all UEs are a member of a group and in such scenarios UEs 406 and 408 may not be present or may belong to one or more groups. Also, the number of mini resource pools 412, 414 reserved or provided for the respective groups may be different, for example, the base station may provide less or more mini resource pools for the group 402 or more than one resource pool 414 for the second group 404.

Moreover, FIG. 4 illustrates an example in which the respective mini resources pools 412, 414 comprise a plurality of continuous resources across a frequency domain and adjacent across the time domain, however, the invention is not limited to such configurations, rather, in accordance with other embodiments, the respective resources forming a mini resource pool 412, 414 may be non-continuous resources across the frequency domain and/or non-adjacent resources across the time domain. Note that resources may also be allocated over the spatial domain utilizing multiple input multiple output (MIMO)-processing at the base station and/or at the UE. The spatial domain may be used in combination with both frequency and/or time domains. The one or more mini resource pools 412, 414 may include a plurality of groups of resources including at least a first group and a second group, the first and second group having different numerologies, like a different subcarrier spacing, a different slot length or a different number of supported channels. For example, dependent on a quality of service, QoS, requirement, resources to be allocated may be selected from a mini resource pool with the numerology needed for meeting the QoS requirements. For example, the mini resource pool 412 or 414 may include the groups of resources having different numerologies. In accordance with other embodiments, the overall resource pool 410 may include the groups of resources with different numerologies, for example, a first group having a first numerology, as indicated at $410_1$, and a second group with a second numerology as indicated at $410_2$. For example, for group 402, the base station provides the mini resource pool 412 including resources from the first group of resources $410_1$ and from the second group of resources $410_2$. For example, a UE being a member of one of the groups 402, 404 may send to the base station 400, directly or indirectly, its QoS requirements and receive, directly from the base station or indirectly from the base station via the group leader or another group member a confirmation that resources belonging to a needed numerology for meeting the QoS requirements are allocated. Once the confirmation is received, the respective member UE may provide the base station 400, directly or indirectly, with an estimated data usage so as to allow the base station 400 to allocate the resources for the apparatus from the appropriate mini resource pool. The above-mentioned groups of resources with different numerology may employ different subcarrier spacings, and the respective one or more groups of resources may be referred to as bandwidth parts.

In the example of FIG. 4, it is assumed that group 402 includes a leader $402_1$. For example, each of the groups 402, 404 may have assigned a group ID, for example by the application to be executed, as mentioned above, and each member of the group, also referred to as remote, RV, UE is aware of the group ID. Communication between the RVs and the leader of the group, also referred to as the host UE, may be carried out internally using the group ID and the sidelink communication interface which, in turn, allows to meet the desired latency and reliability requirements defined by the application so as to meet a desired quality of service. For example, when considering the platooning of a plurality of vehicles being equipped with respective user devices and being grouped together into a single group, the meeting of the desired latency and reliability requirements is important for the working of the group communications as each UE travels with very short distances between each other in order to achieve the desired advantages of platoon driving, like reduced wind resistance, high fuel efficiency and the like. Using the sidelink communication among the member UEs any message which has to be delivered with a low latency, like an emergency message, may be transmitted among the UEs with the involved latency and reliability thereby providing each of the vehicles equipped with the UEs enough time to react. The leader UE $402_1$ of the group 402 may request the set of resources or the mini resource pool, mRP, from the resource pool 410 for the entire group to eliminate the need for each individual member $402_2$, $402_3$ to request for its own separate resources from the base station. The members of the group communicate using the resources within the allocated mini resource pool 412. In other words, in the group 402, the request for resources may only be handled by the leader UE $402_1$ and the remaining UEs $402_2$ and $402_3$ do not communicate with the base station 400 for obtaining information about resources to be used for the group's internal communication using the PC5 interface. Thus, the signaling between the group 402 and the base station 400 for obtaining the needed control information and information about the resources to be used may be reduced substantially because only the leader UE $402_1$ communicates with the base station 400 to receive this information, and the other UEs do not communicate with the base station. It is noted that the respective other UEs $402_2$ and $402_3$ of the group 402 may communicate directly with the base station 400 for any non-group communication. For example, in case a certain situation is detected by the UE $402_3$ that may be of interest for all UEs, like an accident or a severe weather condition, when considering the platooning use case, the UE $402_3$ may signal this within the group using the PC5 interface and, in addition, it may signal this to the base station 400 for distribution to other UEs within the coverage or to the application, and/or to other nearby UEs not belonging to the same group using the SL interface.

As described above, the mini resource pool or the set of resources to be used by a group of UEs for a groupcast communication within the group may be defined by a base station, e.g., for UEs operating in NR mode 1. However, in case of NR mode 2 operations, for example, when the group is no longer supported by the base station with regard to the SL resource allocation, e.g., in case the base station stops providing SL resource allocation configuration or assistance or such configuration or assistance is no longer available, the UEs in the group need to allocate resources again for a set of resources, like pre-configured resources in the system, for the groupcast communication, leading again to potential delays in SL communications, signaling overhead and the like.

The present invention addresses this situation, i.e., a situation in which a group of UEs is not or no longer provided with SL resource allocation configuration or assistance by the base station, so as to handle the resource allocation for communications within the group efficiently. For example, a base station may, basically, be capable of providing SL resource allocation configuration or assistance but the SL resource allocation configuration or assistance for the groupcast resource allocation may be disabled, e.g., because of a low groupcast resource utilization, or because the group UE is moving fast within the base station coverage so that it may be judged likely that the group of UEs will only be within the coverage area for a short period of time, or because there are only low QoS requirements to be fulfilled for a group. In accordance with the inventive approach, when considering a group of UEs, which receive from a base station SL resource allocation configuration or assistance, the base station or gNB will ensure that the subset of resources to be used for the group internal communication are updated based on the demands of the group. In case the base station does no longer provide SL resource allocation configuration or assistance, the leader UE may retain the subset of group resources which has been provided by the base station for a fixed period of time. Once the time period elapses, the leader UE may decide on the amount of resources needed for the group, e.g., based on the demands by the member UEs, based on the estimated usage in the previous time period or based on the inputs from the application service, and the resources may be selected by the leader UE from a set of resources provided by the system, for example by carrying out a sensing procedure in the previous time slot and/or by listening to announcements by other leader UEs so as to avoid selecting overlapping resources.

In other words, the defined mini resource pool may be maintained for a certain duration of time, after which the leader UE may carry out a sensing of known predefined resource pools to be used when there is no more SL resource allocation configuration or assistance by the base station (also referred to as the UEs being out of coverage) so as to alter or completely change the set of resources to be used for the group communication within the group. The group leader may also instruct other group member UEs to perform sensing and may collect the sensing results. This may aid the group leader in choosing interference-free resources for the group communication.

The inventive concept, however, is not limited to groups of UEs for which SL resource allocation configuration or assistance by the base station stops or is no longer available, rather, it may also be applied to a group formed by UEs operating in NR mode 2 from the beginning and for which a leader UE is determined which gathers the demands for resources for the respective UEs of the group to carry out respective transmissions and which performs the sensing so as to obtain a mini resource pool or a set of group resources to be used for the group internal communication or the groupcast communication from the set of resources provided by the wireless communication system. For example, resources may be selected which are available, free, unused or vacant in the set of resources.

Figure 5:
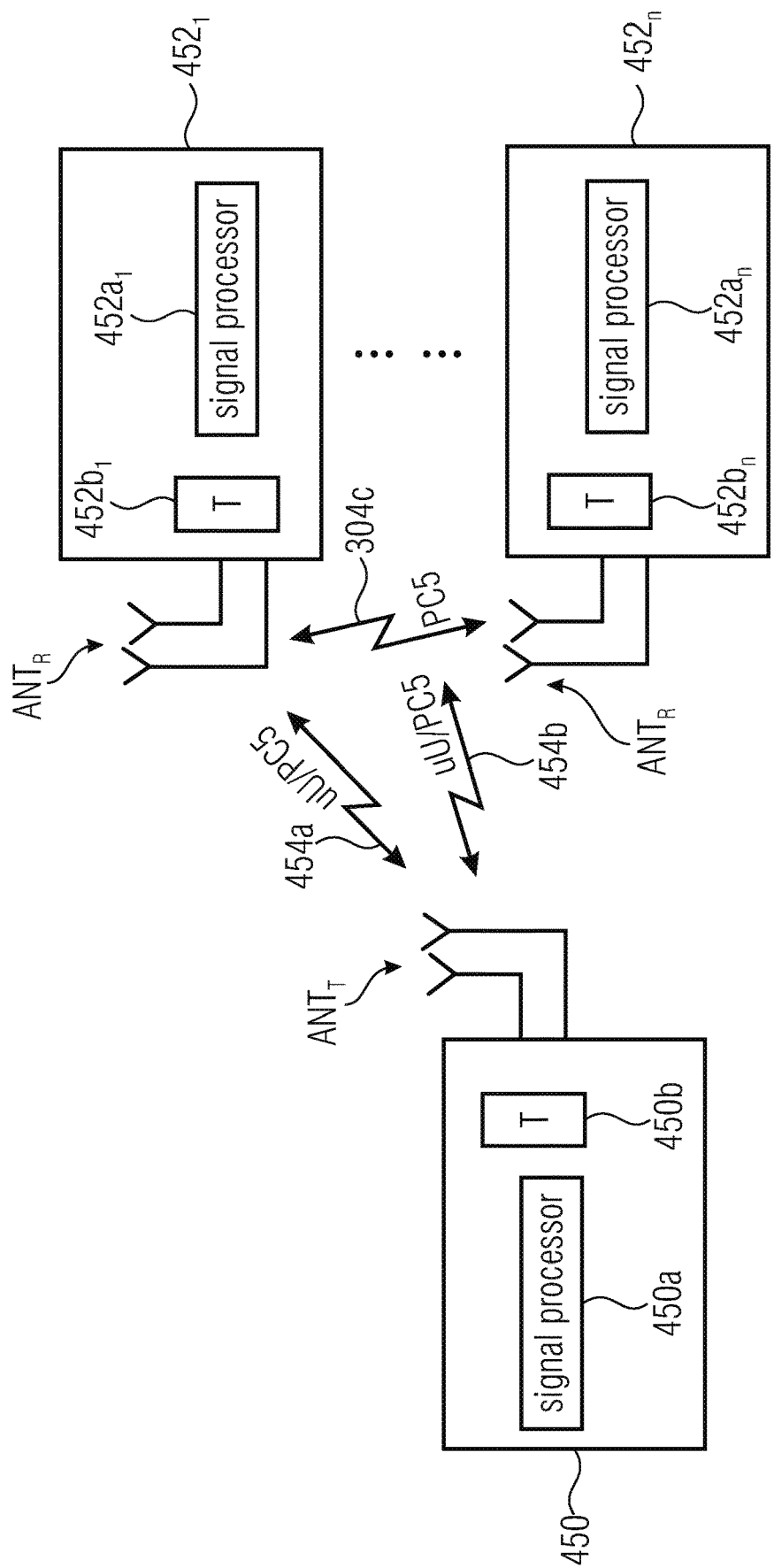
FIG. 5 is a schematic representation of a wireless communication system for communicating information between a transmitter and one or more receivers in accordance with embodiments of the present invention.

Stated differently, the present invention aims at providing an improved approach for providing or defining the resources for the communication within groups of UEs when no SL resource allocation configuration or assistance is provided by a base station. This is addressed by the present invention as described hereinbelow in more detail, and embodiments of the present invention may be implemented in a wireless communication system as depicted in FIG. 1, FIG. 2, FIG. 3 and FIG. 4 including base stations and users, like mobile terminals or IoT devices. FIG. 5 is a schematic representation of a wireless communication system including a transmitter 450, like a base station, and one or more receivers $452_1$ to $452_n$, like user devices, UEs. The transmitter 450 and the receivers 452 may communicate via one or more wireless communication links or channels 454a, 454b, 454c, like a radio link. The transmitter 450 may include one or more antennas $ANT_T$ or an antenna array having a plurality of antenna elements, a signal processor 450a and a transceiver 450b, coupled with each other. The receivers 452 include one or more antennas $ANT_R$ or an antenna array having a plurality of antennas, a signal processor $452a_1$, $452a_n$, and a transceiver $452b_1$, $452b_n$ coupled with each other. The base station 450 and the UEs 452 may communicate via respective first wireless communication links 454a and 454b, like a radio link using the Uu interface, while the UEs 452 may communicate with each other via a second wireless communication link 454c, like a radio link using the PC5 interface. When the UEs are not served by the bases station, are not be connected to a base station, for example, they are not in an RRC connected state, or, more generally, when no SL resource allocation configuration or assistance is provided by a base station, the UEs may communicate with each other over the sidelink. The system and the one or more UEs 452 may operate in accordance with the inventive teachings described herein.

The present invention provides an apparatus for a wireless communication system, the wireless communication system including one or more base stations and a plurality of user devices, UEs, wherein the apparatus is configured to be connected to one or more UEs via a sidelink for a sidelink communication with the one or more UEs, the apparatus and the one or more UEs forming a group of UEs and using a set of group resources to be used for the sidelink communication within the group of UEs, and in case a base station does not provide resource allocation configuration or assistance, the apparatus is configured to select resources from a set of resources provided by the wireless communication system so as to alter or completely change the set of group resources to be used for the sidelink communication within the group of UEs.

Thus, in accordance with embodiments, a leader UE (=apparatus) is provided which is "in charge" of selecting resources for an entire group of UEs when the base station does not or no longer provide resource allocation configuration/assistance.

In accordance with embodiments, in case the base station does not provide resource allocation configuration or assistance, the apparatus is configured to decide on the amount of resources needed for the group of UEs, and select from the set of resources the resources to be used for the sidelink communication within the group of UEs.

In accordance with embodiments, to decide on the amount of resources needed for the group of UEs, the apparatus is configured to receive from one or more of the UEs of the group of UEs one or more demands for resources to be used for the sidelink communication within the group of UEs, and decide on the amount of resources needed for the group of UEs based on the received one or more demands, and/or obtain the amount of resources needed for the group of UEs from an application, and/or estimate the amount of resources needed for the group of UEs, e.g., based on a history of needed resources.

In accordance with embodiments, to select from the set of resources the resources to be used for the sidelink communication within the group of UEs, the apparatus is configured to carry out a sensing procedure, e.g., in one or more previous time slots, and/or listening to announcements indicative of resources used by other UEs.

In accordance with embodiments, the apparatus is configured to exclusively sense/select the set of group resources from the set of resources.

In accordance with embodiments, the one or more UEs forming with the apparatus the group of UEs do not sense or select the set of group resources for the sidelink communication within the group of UEs but receive information about the set of group resources solely from the apparatus. In other words, in accordance with embodiments, non-leader UEs (RV-UEs) may receive group resource information only from leader UE (HV-UE) and do not perform sensing for group resources—although sensing for broadcast resources may be performed individually by each UE.

In accordance with embodiments, in case an amount of resources selectable from the set of resources is less than the needed resources, the apparatus is configured to use the set of group resources only for communicating certain messages among the group UEs.

In accordance with embodiments, the certain messages have a priority associated therewith which is higher than a priority of other messages to be communicated among the group UEs.

In accordance with embodiments, the other messages are send by the respective one or more UEs via resources sensed and chosen from the set of resources by the respective one or more UEs.

In accordance with embodiments, the apparatus is configured to establish respective links within the group of UEs using
    the sidelink protocol, like the PC5 Signaling Protocol, or the RRC protocol on the sidelink.

In accordance with embodiments, when using the RRC protocol on the sidelink, the apparatus is configured to
    send to the one or more UEs control messages in a configurable manner, like periodic/aperiodic/UE-specific control messages, and/or
    receive the resource demands from the UEs using the RRC signaling, and/or
    select and allocate resources dynamically and semi-statically to the UEs.

In accordance with embodiments, when using the RRC protocol on the sidelink, the apparatus is configured to signal one or more RRC messages to the UEs, the one or more messages including for example one or more of a paging message, connection setup messages, reconfiguration messages, measurement reports, connection re-establishment messages, connection release messages.

In accordance with embodiments, the apparatus is configured to announce the sensed or selected resources to all group UEs.

In accordance with embodiments, to announce the sensed or selected resources to all group UEs, the apparatus is configured to send a message broadcasting information identifying the sensed/selected set of group resources to be used for the sidelink communication within the group of UEs, the message being send on the group resources or on other resources from the set of resources provided by the wireless communication system.

In accordance with embodiments, the apparatus is configured to announce the sensed or selected resources to all group UEs in one or more of the following ways:
    in the form of a field within a SCI transmitted by the apparatus to UEs of the group,
    via a sidelink paging signal to all UEs in the vicinity, e.g., using a SL information block,
    using the ProSe Direct Discovery mechanism.

In accordance with embodiments, the apparatus is configured to announce the sensed or selected/reserved resources to all group UEs
    inform all UEs of the group about the set of group resources to be used for the sidelink communications within the group, and
    inform one or more other groups of UEs that the selected set of group resources are currently used by the group of UEs.

In accordance with embodiments, the content of the announcement contains time-frequency information of the sensed/selected set of group resources, the set of group resources defining, e.g., a resource pool, a mini-resource pool, a band width part, BWP, in a resource pool, or a resource pool in a BWP.

In accordance with embodiments, the apparatus is configured to announce the sensed or selected resources to all group UEs repeatedly, e.g., in a periodic manner.

In accordance with embodiments, the apparatus is configured to announce the sensed or selected/reserved resources to all group UEs in an event-triggered manner, e.g. when the selected/reserved resource configuration has changed in the event of connection re-establishment.

In accordance with embodiments, the apparatus is configured to perform the sensing/selecting of the set of group resources to be used
    (a) when or at a certain time before a certain, e.g., predefined, time period, after the base station stopped providing resource allocation configuration or assistance, elapsed, and/or
    (b) when or at a certain time before a certain, e.g., predefined, validity period for currently used set of group resources elapses, and/or
    (c) when or at a certain time before a certain location is reached by the apparatus of by the group of UEs, e.g., based on the location of the group, i.e. if the UE moves from one zone to another zone.

In accordance with embodiments, the validity period is based on a fixed time period or on a counter based on a number of times the apparatus send announcements.

In accordance with embodiments, the apparatus is configured to carry out a reselection of resources and announce a new set of group resources to all groupcast UEs at a certain time before the validity period lapses so that the group UEs shift from the current set of group resources to the new set of group resources when the validity period lapsed.

The present invention provides an apparatus for a wireless communication system, the wireless communication system including one or more base stations and a plurality of user devices, UEs, wherein
    the apparatus is configured to be connected to one or more UEs via a sidelink for a sidelink communication with the one or more UEs, the apparatus and the one or more UEs forming a group of UEs and using a set of group resources to be used for the sidelink communication within the group of UEs, wherein one of the UEs is a leader UE, and in case the base station does not provide resource allocation configuration or assistance, the apparatus is configured to
send to the leader UE a demand for resources to be used by the apparatus for the sidelink communication within the group of UEs, and
receive from the leader UE a set of group resources exclusively sensed/selected by the leader UE from set of resources, the set of group resources to be used for the sidelink communication within the group of UEs.

The present invention provides an apparatus for a wireless communication system, the wireless communication system including one or more base stations and a plurality of user devices, UEs, wherein
the apparatus is configured to be connected to one or more UEs via a sidelink for a sidelink communication with the one or more UEs, the apparatus and the one or more UEs forming a group of UEs, and
wherein the apparatus is configured to establish respective links within the group of UEs using the RRC protocol on the sidelink.

In other words, another aspect of the invention (to be used independent of or in combination with the previous aspects, in accordance with embodiments, provides a leader UE (=apparatus) that uses SL RRC on the sidelink.

In accordance with embodiments, the apparatus is configured to signal one or more RRC messages to the UEs, the one or more messages including for example one or more of a paging message, connection setup messages, reconfiguration messages, measurement reports, connection re-establishment messages, connection release messages.

In accordance with embodiments, the set of resources include a plurality of groups of resources, the plurality of groups of resources including at least a first group of resources having a first numerology and a second group of resources having a second numerology, the first and second numerologies being different.

In accordance with embodiments, the set of resources comprises a plurality of contiguous or non-contiguous resources across a frequency domain and adjacent or non-adjacent across a time domain.

In accordance with embodiments, the apparatus comprises one or more of a mobile terminal, or stationary terminal, or cellular IoT-UE, or vehicular UE, or an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator.

System

The present invention provides a wireless communication network, comprising at least one of the inventive UEs and at least one of the inventive base stations. A base station may comprise one or more of a macro cell base station, or a small cell base station, or a central unit of a base station, or a distributed unit of a base station, or a road side unit, or a UE, or a remote radio head, or an AMF, or a SMF, or a core network entity, or mobile edge computing entity, or a network slice as in the NR or 5G core context, or any transmission or reception point, TRP, enabling an item or a device to communicate using the wireless communication network, the item or device being provided with network connectivity to communicate using the wireless communication network.

Methods

The present invention provides a method for operating an apparatus of a wireless communication system having one or more base stations and a plurality of user devices, UEs, the apparatus connected to one or more UEs via a sidelink for a sidelink communication with the one or more UEs, the apparatus and the one or more UEs forming a group of UEs and using a set of group resources to be used for the sidelink communication within the group of UEs, the method comprising:
in case a base station does not provide resource allocation configuration or assistance, selecting, by the apparatus, resources from a set of resources provided by the wireless communication system so as to alter or completely change the set of group resources to be used for the sidelink communication within the group of UEs.

The present invention provides a method for operating an apparatus of a wireless communication system having one or more base stations and a plurality of user devices, UEs, the apparatus connected to one or more UEs via a sidelink for a sidelink communication with the one or more UEs, the apparatus and the one or more UEs forming a group of UEs and using a set of group resources to be used for the sidelink communication within the group of UEs, wherein one of the UEs is a leader UE, the method comprising:
in case the base station does not provide resource allocation configuration or assistance, sending to the leader UE a demand for resources to be used by the apparatus for the sidelink communication within the group of UEs, and receiving from the leader UE a set of group resources exclusively sensed/selected by the leader UE from set of resources, the set of group resources to be used for the sidelink communication within the group of UEs.

The present invention provides, a method for operating an apparatus of a wireless communication system having one or more base stations and a plurality of user devices, UEs, the apparatus connected to one or more UEs via a sidelink for a sidelink communication with the one or more UEs, the apparatus and the one or more UEs forming a group of UEs, the method comprising:
establishing, by the apparatus, respective links within the group of UEs using the RRC protocol on the sidelink.

Computer Program Product

The present invention provides a computer program product comprising instructions which, when the program is executed by a computer, causes the computer to carry out one or more methods in accordance with the present invention.

Figure 6:
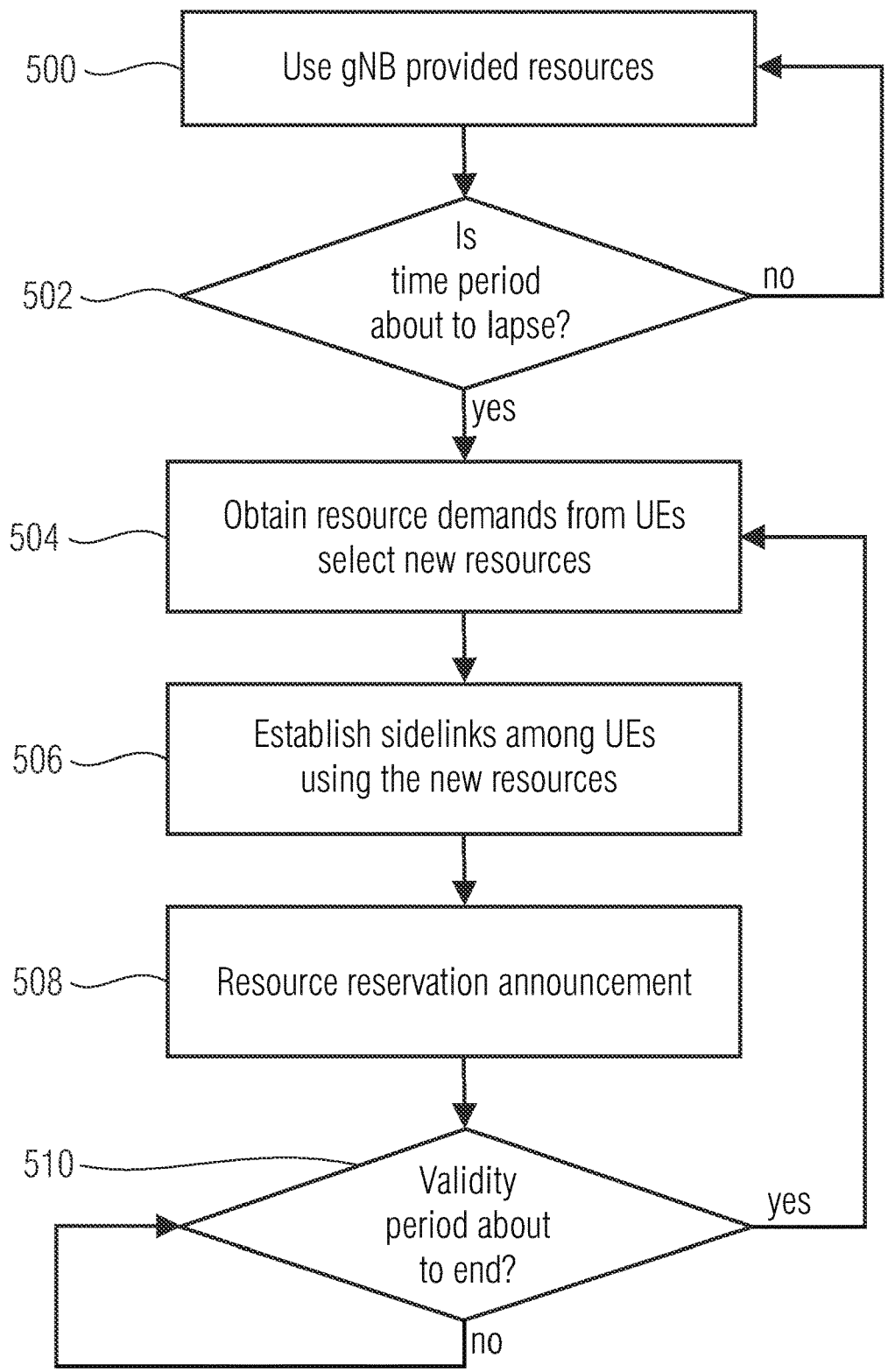
FIG. 6 illustrates a diagram representing the activities of a leader UE of a group of UEs to be performed in accordance with embodiments of the present invention.

Embodiments of the present invention will now be described in more detail, and FIG. 6 illustrates a diagram representing the activities of a leader UE of a group of UEs to be performed for selecting resources in accordance with embodiments of the present invention. This embodiment assumes that for the group of UEs SL resource allocation configuration/assistance was provided by a base station until a certain time so that a mini resource pool or a set of resources to be used for the group communication within the group exists, and that, at the certain time, no more SL resource allocation configuration or assistance by a base station is available for the group, which may by also referred to as the group being out-of-coverage or operating in NR Mode 2. In such a situation the leader UE retains the gNB provided subset of resources or group resources for a predefined period of time, like a fixed period of time. In FIG. 6, as is shown at block 500, initially the group of UEs uses the resources provided by the gNB for the group internal communication and, as is indicated at block 502, as long as a certain time period, which may be predefined by system parameters, has not lapsed, the use of the gNB provided resources is maintained. In case it is determined in block 502 that the predefined time period is about to lapse, for example in case it is determined that a certain time before the end of the time period is reached, the leader UE may obtain from the UEs of the group respective demands for resources and select new resources, as is indicated at 504, from a set of resources, like a preconfigured resource set or pool provided, for example, by the wireless communication system. Once the time period has finally lapsed, the leader UE establishes sidelink connections among the UEs using the new resources, as is indicated at 506 in FIG. 6. As mentioned, the leader UE may receive from one or more of the UEs of the group of UEs one or more demands for resources to be used for the sidelink communication within the group of UEs, and decide on the amount of resources needed for the group of UEs based on the received one or more demands. In accordance with other embodiments, the leader UE may obtain the amount of resources needed for the group of UEs from an application running on the UEs, and/or estimate the amount of resources needed for the group of UEs, e.g., based on a history of needed resources. The resource demands may be obtained periodically, and the selecting of the resources by the leader UE may include sensing procedures in previous time slots and/or listening to announcements from other leader UEs so as to avoid selecting overlapping resources from the resource pool, like a resource pool provided for SL communications in the system.

In accordance with embodiments, the sensing may be performed continuously or shortly before the new resources are selected. A resource reselection may happen before the validity of the old resources run out. This allows for the advertisement/broadcasting of the new resources beforehand. The sensing procedure may include sensing and decoding of control information, like group announcements of other UEs.

In accordance with embodiments, there may be situations when the leader UE recognizes that there is a contention on the available resources to be used for the group communication, meaning that the leader UE may not be able to select all resources needed for a reliable operation or communication among all UEs. For example, the amount of unused or free resources from the resource pool may not be sufficient so as to satisfy all resource demands. In such situations, the leader UE may limit the group communication to certain communications, services or events, for example only to high priority messages, like emergency messages, to be exchanged among the respective UEs while other messages having a lower priority may be transmitted by the individual UEs of the group using a conventional broadcast channel or resources which the respective UEs of the group sensed from the available resources in the resource pool by themselves.

In accordance with embodiments of the inventive approach, at 506 establishing the sidelink connections among the UEs may include establishing a communication with the sidelink using the sidelink protocol, as it is described for example in TS 23.303, "Proximity-based services (ProSe), Stage 2 (Release 15)", V15.1.0, 3GPP, June 2016. In accordance with other embodiments, rather than using the sidelink protocol, like the PC5 Interface Protocol, the RRC signaling protocol may be employed for establishing the links among the UEs of the group over the sidelink (PC5 interface) which is also referred to as a SL RRC that is established between the leader UE and the member UEs.

The SL RRC allows establishing and maintaining the links between the leader UE and the member UEs for groupcast communications within the group. SL RRC enables link management for groupcast and unicast communications. When compared to the SL protocol, SL RRC is advantageous as it offers the option for the leader UE to send control messages in a configurable manner, like periodically, aperiodically or user specific, to the respective member UEs. Also resource demands of the UEs may be sent using SL RRC signaling. The leader UE may select and allocate resources dynamically and semi-statically to the member UEs, in a similar way as it would be done by a base station. In accordance with embodiments, SL RRC messages may include one or more of a paging message, a connection setup message, a reconfiguration message, a release message, a connection re-establishment message or a measurement reporting message. Naturally, these messages are only examples, and it is noted that the inventive approach is not limited to the depicted messages, rather, any other RRC message as it is conventionally used for communication between a UE and a base station may also be employed for the SL RRC.

Figure 7A:
FIG. 7(a) illustrates several examples for SL RRC messages used on a SL in accordance with accordance with embodiments of the present invention.

FIG. 7(a) illustrates an example for a SL paging broadcast signaling between a leader UE and one or more member UEs. The leader $402_1$ sends out an SL paging signal which is received by the member UEs $402_2$ and $402_3$, and the SL paging signal may be used by the leader UE $402_1$ to broadcast information to all UEs in its vicinity which includes not only the member UEs but also other UEs not being a member of the group. In other words, the paging signal may be received by other UEs as well, since it is a broadcast message, and UEs do not have to be in a RRC_Connected Mode to receive paging messages. By this, for example, the member UEs $402_2$, $402_3$ may be informed about the resources to be used for the group communication within the group, while other UEs not being members of the group are also informed about resources which are occupied and not available for a communication as they are to be used exclusively for the group internal communication of the group including the leader UE and the member UEs. Thus, other UEs, when sensing for the resources to be used in the resource pool have knowledge about reserved or used resources for the group communication within a certain group of UEs.

Figure 7B:
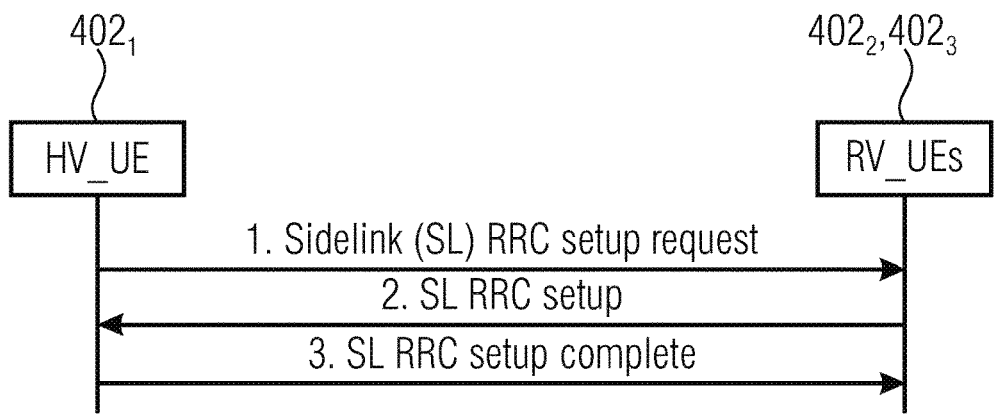
FIG. 7(b) illustrates an example for a SL RRC setup signaling between a leader UE and a member.

FIG. 7(b) illustrates an example for a SL RRC setup signaling between a leader UE $402_1$ and the member UEs $402_2$, $402_3$ of the group. Initially, the leader UE sends a SL RRC setup request to the member UEs, advantageously using the resources for the groupcast communication, and the member UEs return the SL RRC setup message so that once the setup is completed, the leader UE transmits the SL RRC setup complete message to the member UEs.

Figure 7C:
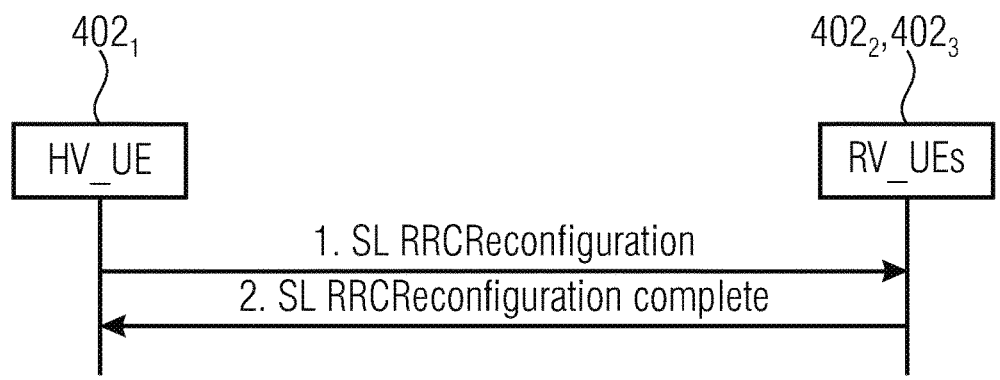
FIG. 7(c) illustrates an example for a SL RRC reconfiguration signaling between a leader and a member.

FIG. 7(c) illustrates an example for a SL RRC reconfiguration signaling between a leader UE $402_1$ and the member UEs $402_2$, $402_3$ by which the leader UE $402_1$, for example, using the resources for the groupcast communication, informs one or more of the member UEs $402_2$, $402_3$ about changes in the configuration of the communication among the UEs by sending a SL RRC reconfiguration message to the member UEs $402_2$, $402_3$ which, after completing the reconfiguration respond to the leader UE $402_1$, by the SL RRC reconfiguration complete message.

Figure 7D:
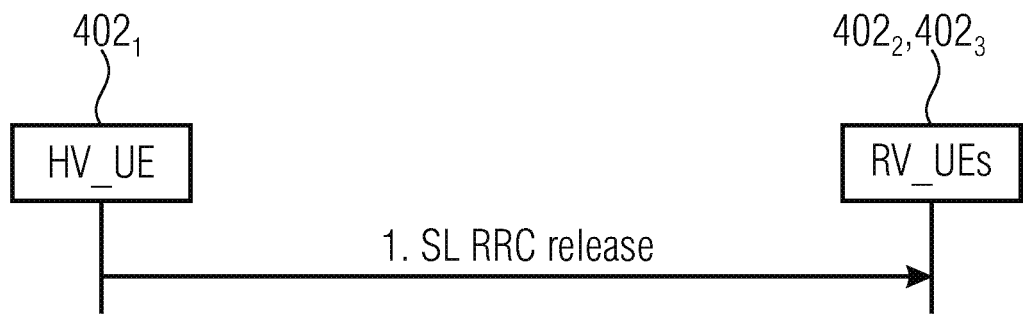
FIG. 7(d) illustrates an example for a SL RRC release signaling between a leader UE and member UEs.

FIG. 7(d) illustrates an example for a SL RRC release signaling between a leader UE $402_1$, and the member UEs by which the leader UE $402_1$, for example, using the resources for the groupcast communication, releases the connection to one or more of the member UEs 402₂, 402₃, e.g., in case a UE leaves the group.

Figure 7E:
FIG. 7(e) illustrates an example for a SL RRC connection re-establishment signaling between a leader UE and a member.

FIG. 7(e) illustrates an example for a SL RRC connection re-establishment signaling between a leader UE 402₁ and the member UEs 402₂, 402₃ by which the leader UE 402₁, for example, using the resources for the groupcast communication, informs one or more of the member UEs 402₂, 402₃ about changes in the configuration of the communication among the UEs or would like to modify an RRC connection by sending a SL RRC reconfiguration message to the member UEs 402₂, 402₃ which causes a reconfiguration needing a re-connection (due to a failure of the RRC reconfiguration message). After completing the reconfiguration, the leader UE 402₁, and the one or more of the member UEs 402₂, 402₃ exchange messages to re-establish the RRC connection.

Figure 7F:
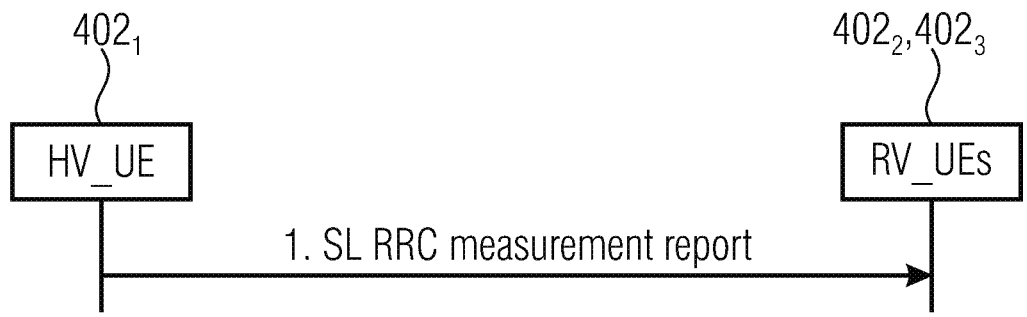
FIG. 7(f) illustrates an example for a SL RRC measurement report signaling between a leader and a member.

FIG. 7(f) illustrates an example for a SL RRC measurement report signaling between a leader UE 402₁, and the member UEs 402₂, 402₃ by which one or more of the member UEs 402₂, 402₃ provide to the leader UE a measurement report, e.g., a buffer status report for indicating the needed resources for a communication over the sidelink or a new MAC signaling, or a resource occupancy report indicating the available resources which the leader UE 402₁ could select for the mini resource pool for internal group communications within the group.

In the embodiments of FIG. 7(a)-(f), the group members (RVs and HV) are in a SL RRC Connected or SL Group connected Mode to perform SL RRC link control, i.e. the group leader and its member UEs are established beforehand. The RV_UEs may comprise of a set of members, e.g. RV_UEs={RV_UE1, RV_UE2, RV_UE3, . . . } with a specified group member limit.

Figure 7G:
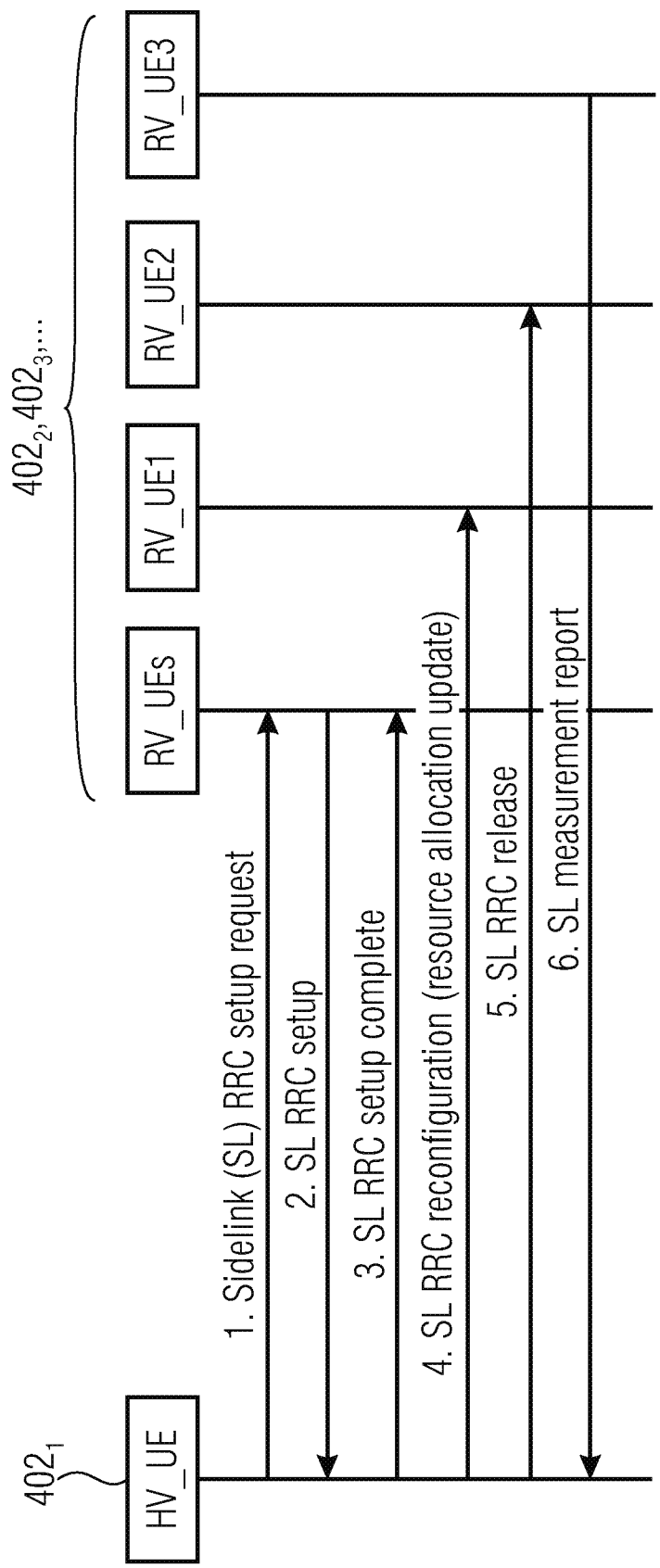
FIG. 7(g) illustrates an application diagram in accordance with an embodiment to indicate how an HV may use SL RRC signaling to configure three individual RV_UEs in a group in a unicast fashion.

FIG. 7(g) illustrates an application diagram in accordance with an embodiment to indicate how an HV UE 402₁ may use SL RRC signaling to configure three individual RV_UEs in a group in a unicast fashion. FIG. 7(g) illustrates a group of 4 UEs (including group leader 402₁). Initially, SL RRC is setup and sent to all RV_UEs (Steps 1-3), similar to FIG. 7(b). At step 4 an individual RRC configuration update message, e.g., a new resource allocation configuration, is sent to RV_UE1 via RRC signaling, for example, because RV_UE1 would like to send a larger message and therefore needs more resources. At step 5 the HV_UE likes to disconnect (or kick out) RV_UE2 from the group and sends a release message to RV_UE2. At step 6 RV_UE3 may want to send a periodic/event-triggered measurement report to the HV_UE. It is noted that steps 4-6 may be also sent/received simultaneously by the HV_UE.

It is noted that the above described concept regarding the use of RRC signaling messages over the sidelink may be employed not only in the context of the above-described scenarios, rather, this concept may be employed for any group of UEs having assigned a leader UE, and using resources, which are allocated by a base station, sensed by the leader UE or sensed by the other UEs in the group, for a groupcast communication among the UEs over the sidelink. The communication may be performed using RRC signaling instead of the sidelink protocol. Stated differently, in accordance with embodiments, a communication over a sidelink among a plurality of UEs may include a leader UE acting as a kind of "mini base station" and using SL RRC messages for establishing the links between the leader UE and the other UEs.

Returning to FIG. 6, following the establishing of the sidelink connections at block 506, in accordance with further embodiments, the leader UE may carry out a resource reservation announcement, as is indicated at block 508. For example, the leader UE may announce the resources selected at 504 to the respective member UEs over the established sidelink so that the member UEs are aware of the resources to be exclusively used within the group for a groupcast communication. In accordance with embodiments, the resource reservation announcement may be transmitted using the broadcast message so that not only the member UEs of the group are informed but also other UEs or other groups of UEs or leader UEs of other groups are also informed so that these UEs not belonging to the group are aware of the resources reserved for the group.

The announcement message may be transmitted in different ways, and in accordance with an embodiment, the announcement message may be transmitted using the SCI protocol, for example in the form of a field within a sidelink control information, SCI, which is transmitted by the leader UE to the other UEs. The SCI may define the resources to be used for the groupcast communication, like the above-mentioned mini resource pool. In accordance with another embodiment, the announcement message may be transmitted using a sidelink RRC paging signal, as described above with reference to FIG. 7(a) to all UEs in the vicinity of the leader UE including member UEs of the group and other UEs not being a member of the group. For example, the information may be transmitted using the SL information block.

In accordance with yet other embodiments, the announcement message may be transmitted using the ProSe direct discovery mechanism based on the model A as is described in TS 23.303, "Proximity-based services (ProSe), Stage 2 (Release 15)", V15.1.0, 3GPP, June 2016. In model A, two types of UEs are involved, namely the announcing UE, which in the present embodiment is the leader UE, and the monitoring UEs which are the member UEs of the group and possible other member UEs or leader UEs of other groups or other UEs. The announcing UE may broadcast information on the same carrier (intra-discovery) or on a different carrier (inter-discovery), and as such, all the monitoring UEs are enabled to monitor such broadcast information using intra-discovery or inter-discovery.

The resource reservation announcement may be employed when the group of UEs is not provided with SL resource allocation configuration or assistance by a base station. The resource reservation announcement may be used to inform all member UEs of the group about a set of resources to be used for the groupcast communications within the group, and/or to inform all UEs outside the group, like leader UEs of other groups, that the selected subset of resources is currently being used so that other UEs are aware of the reserved resources for the group and do not use these resources.

The announcement message may be periodic, and the periodicity may be configured so as to make sure that any potential new member of the group receives the announcement and may request the leader UE to become a member of the group.

The content of the announcement message may contain a time-frequency information about the resources reserved for the group, for example information about the resource pool, the mini-resource pool, a bandwidth part in the resource pool, a resource pool in the bandwidth part and the like, along with the validity period attached to the set of resources. The announcement message may include either an explicit indication of the resources in the pool for each of the UEs in the group, or, in accordance with other embodiments, announcement message may include a relative indication of the resources for each of the UEs in the group, in case the structure of the resource pool is known at the UEs. In other words, the allocation of resources to RVs may be:

absolute in time and frequency, which needs a reconfiguration whenever the resource pool changes, or relative in the resource pool and the resources stay the same when the pool moves so that, e.g., resizing or changing traffic demands may make a reconfiguration compulsory.

FIG. 8 illustrates an embodiment of a resource reservation announcement message as it may be sent out by the leader UE. In the embodiment depicted in FIG. 8, the message includes the "group resource reservation". This group resource reservation includes the group-ID, the group-HV-UE-ID, i.e., an information identifying the group leader, and the resources reserved for the groupcast communication across time and frequency by specifying the sidelink subframe numbers "sl-SubframeRef-r15", and the sensed resources for the groupcast which include the resourceIndex-15 defining the resources across frequency, i.e., the sensed subcarriers so that combining the sl-SubframeRef-r15 and the sensingResult-r15 information defines the time-frequency information of the resources reserved for the group for an internal groupcast communication.

Returning to the description of FIG. 6, in accordance with further embodiments, the subset of resources selected by the leader UE at 504, in accordance with embodiments, may be subject to a validity period which may be a period based on a fixed time period, which may be configurable, or that may be based on a counter identifying the number of times the leader UE announced the reserved resources at block 508. The validity period may be implemented, for example, to avoid an undesired long blockage of the resources reserved by the leader UE at block 504 and/or to provide for a possibility to select new resources, for example in situations in which the QoS requirements of the group changed. For example, in a situation in which the group moved from an initial location to another location, it may be that the currently used resources are no longer suitable as they may be in conflict with resources used in the new location, for example when entering a new zone, so that new resources should be selected. Also, it may be that after a certain time, the requirements of the UEs changed with regard to the requested demands so that it is desirable, after the certain time to determine the new demands or actual demands of the UEs in the group, the number of which may also have changed, so as to select appropriate new resources for the groupcast communication.

Therefore, at 510 in FIG. 6, when the validity period is about to end, for example, at a certain time before the actual end of the validity period, the leader UE may go back to block 504 and obtain the demands from the member UEs of the group so as to select new resources and to announce the new resources to the group cast UEs which will then use the new resources once the validity period ended.

Figure 9:
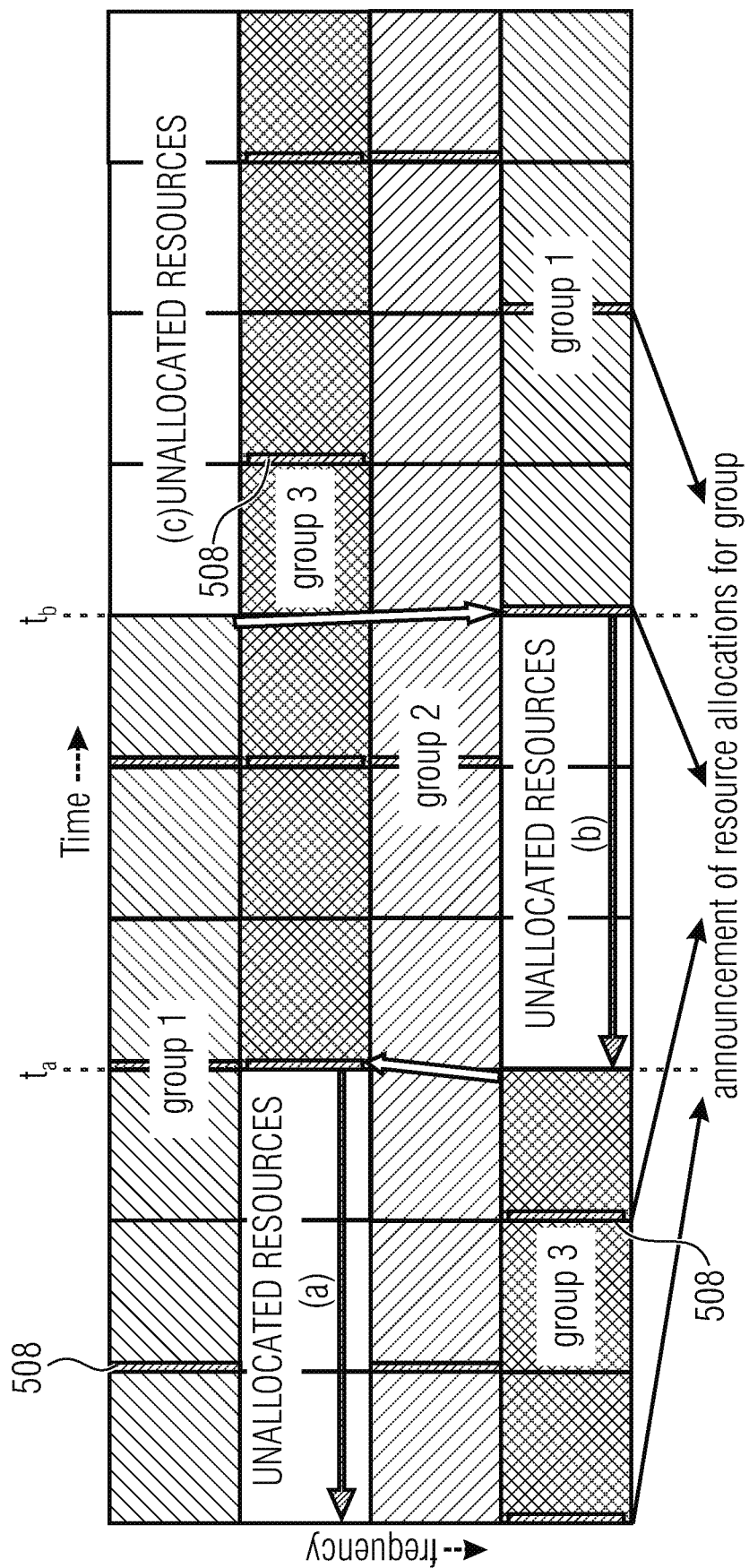
FIG. 9 illustrates an embodiment of the process for allocating new resources once a validity period of currently used resources is about to end.

FIG. 9 illustrates an embodiment of the process for allocating new resources once a validity period of currently used resources is about to end. FIG. 9 shows the time-frequency-resources. In FIG. 9, ten time slots or sub frames are illustrated extending over four consecutive frequency bands or bandwidth parts each including a plurality of frequency subcarriers. Although continuous time blocks and frequency blocks are illustrated, it is noted that in accordance with other embodiments, non-continuous blocks may also be employed. In FIG. 9, some of the resources (a), (b) and (c) are unused or unallocated resources, whereas the remaining resources are allocated either to a first group of UEs or a second group of UEs or a third group of UEs as indicated by group 1, group 2, group 3. FIG. 9 also indicates the respective announcement messages 508 which, in the depicted embodiment, are transmitted periodically every two time frames so as to announce the currently reserved resources for the groupcast communication for group 1, group 2 and group 3. In the embodiment of FIG. 9, it is assumed that group 3 has a validity period for the subset of resources reserved or selected by the leader UE for the group communication to expire at a time $t_a$. Before the expiry at $t_a$, the leader UE carries out a sensing across the available resources and finds the unallocated resources (a) to be available. Once the leader UE has determined the subset of resources to be used after the time $t_a$, the last announcement 508 before the time $t_a$ will inform the member UEs and also other UEs in the vicinity about the new subset of resources the group will be using following the time $t_a$, along with the validity of the new subset. In a similar way, at time $t_b$, the leader UE of group 1 also carries out the above process of sensing and determining a new subset of resources followed by the announcement to the relevant UEs before the time $t_b$.

The process illustrated in FIG. 9 makes sure that there are no two groups which will end up allocating the same set of resources which is achieved, in accordance with the depicted embodiment by the sensing and announcing processes described above.

In some of the embodiments described above, reference has been made to respective vehicles being either in a mode in which SL resource allocation configuration or assistance is provided by a base station, e.g., the connected mode, also referred to as mode 1 or mode 3 configuration, or vehicles being in a mode in which when no SL resource allocation configuration or assistance is provided by a base station, e.g., the idle mode, also referred to as mode 2 or mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 10:
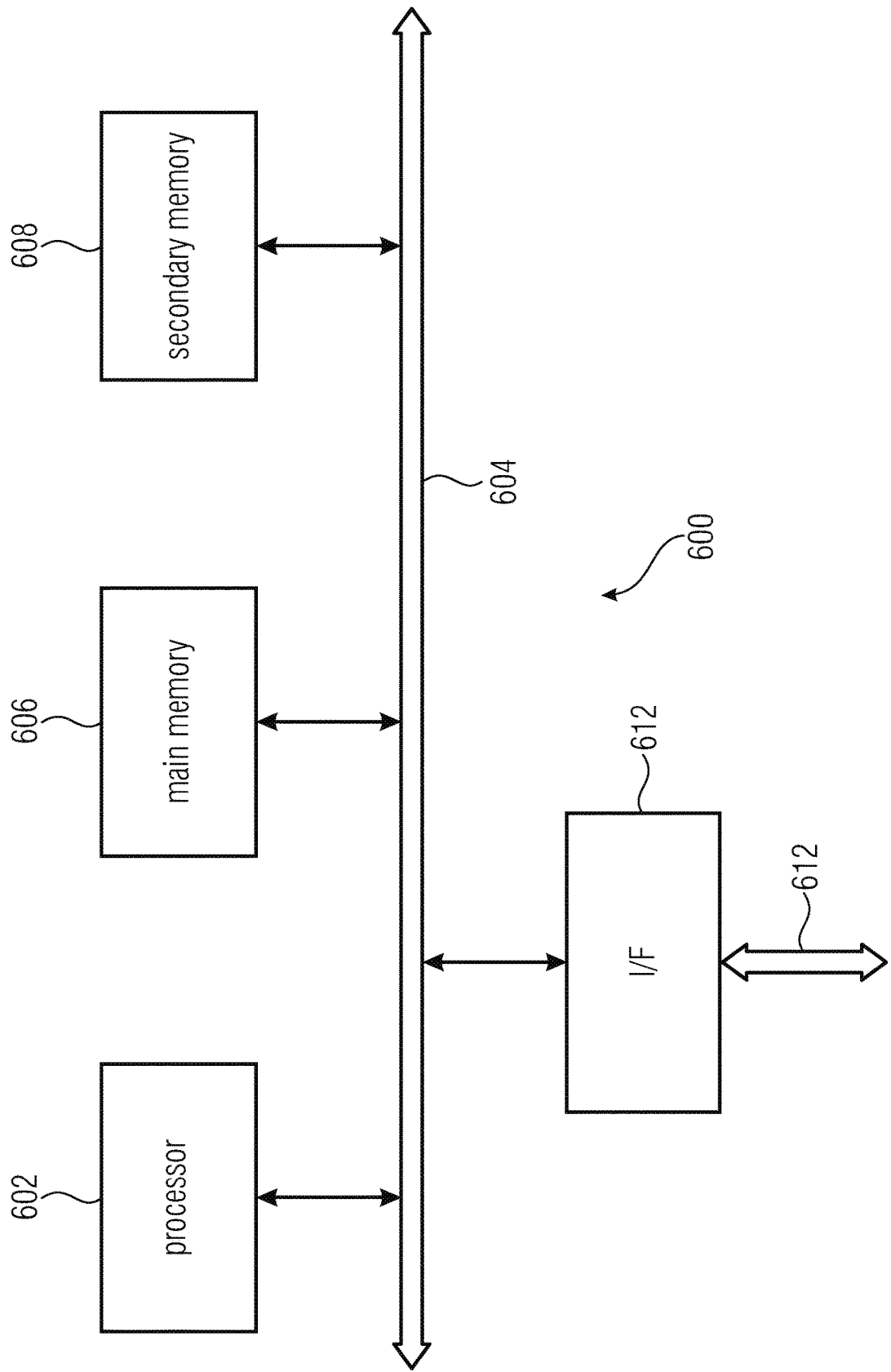
FIG. 10 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random-access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

Embodiments of the Invention

In accordance with the foregoing description, the invention is realized in a variety of embodiments. One embodiment is realized in an apparatus for a wireless communication system, the wireless communication system including one or more base stations and a plurality of user devices, UEs, wherein the apparatus is configured to be connected to one or more UEs via a sidelink for a sidelink communication with the one or more UEs, the apparatus and the one or more UEs forming a group of UEs and using a set of group resources to be used for the sidelink communication within the group of UEs, and in case a base station does not provide resource allocation configuration or assistance, the apparatus is configured to select resources from a set of resources provided by the wireless communication system so as to alter or completely change the set of group resources to be used for the sidelink communication within the group of UEs.

In this embodiment, in case the base station does not provide resource allocation configuration or assistance, the apparatus is configured to decide on the amount of resources required for the group of UEs, and select from the set of resources the resources to be used for the sidelink communication within the group of UEs. As well, the operation to decide on the amount of resources required for the group of UEs, the apparatus is configured to receive from one or more of the UEs of the group of UEs one or more demands for resources to be used for the sidelink communication within the group of UEs, and decide on the amount of resources required for the group of UEs based on the received one or more demands, and/or obtain the amount of resources required for the group of UEs from an application, and/or estimate the amount of resources required for the group of UEs, e.g., based on a history of required resources. Further the operation to select from the set of resources the resources to be used for the sidelink communication within the group of UEs, the apparatus is configured to carry out a sensing procedure, e.g., in one or more previous time slots, and/or listening to announcements indicative of resources used by other UEs.

In addition, the apparatus may be configured to exclusively sense/select the set of group resources from the set of resources. Further, the one or more UEs forming with the apparatus the group of UEs do not sense or select the set of group resources for the sidelink communication within the group of UEs but receive information about the set of group resources solely from the apparatus. In case an amount of resources selectable from the set of resources is less than the required resources, the apparatus is configured to use the set of group resources only for communicating certain messages among the group UEs. Further, the certain messages have a priority associated therewith which is higher than a priority of other messages to be communicated among the group UEs.

In embodiments, the other messages are sent by the respective one or more UEs via resources sensed and chosen from the set of resources by the respective one or more UEs, wherein the apparatus is configured to establish respective links within the group of UEs using:
the sidelink protocol, like the PCS Signaling Protocol, or the RRC protocol on the sidelink.

As well, when using the RRC protocol on the sidelink, the apparatus is configured to
send to the one or more UEs control messages in a configurable manner, like periodic/aperiodic/UE-specific control messages, and/or
receive the resource demands from the UEs using the RRC signaling, and/or
select and allocate resources dynamically and semi-statically to the UEs.

When using the RRC protocol on the sidelink, the apparatus is configured to signal one or more RRC messages to the UEs, the one or more messages including for example one or more of a paging message, connection setup messages, reconfiguration messages, measurement reports, connection re-establishment messages, connection release messages. The apparatus is configured to announce the sensed or selected resources to all group UEs. Further, to announce the sensed or selected resources to all group UEs, the apparatus is configured to send a message broadcasting information identifying the sensed/selected set of group resources to be used for the sidelink communication within the group of UEs, the message being send on the group resources or on other resources from the set of resources provided by the wireless communication system.

Further, the apparatus is configured to announce the sensed or selected resources to all group UEs in one or more of the following ways:
in the form of a field within a SCI transmitted by the apparatus to UEs of the group,
via a sidelink paging signal to all UEs in the vicinity, e.g., using a SL information block,
using the ProSe Direct Discovery mechanism.

In certain embodiments, the apparatus is configured to announce the sensed or selected/reserved resources to all group UEs
inform all UEs of the group about the set of group resources to be used for the sidelink communications within the group, and—inform one or more other groups of UEs that the selected set of group resources are currently used by the group of UEs.

In some embodiments, the content of the announcement contains time-frequency information of the sensed/selected set of group resources, the set of group resources defining, e.g., a resource pool, a miniresource pool, a band width part, BWP, in a resource pool, or a resource pool in a BWP. The apparatus is configured to announce the sensed or selected resources to all group UEs repeatedly, e.g., in a periodic manner. The apparatus is configured to announce the sensed or selected/reserved resources to all group UEs in an event-triggered manner, e.g., when the selected/reserved resource configuration has changed in the event of connection re-establishment.

In certain embodiments, the apparatus is configured to perform the sensing/selecting of the set of group resources to be used:
(d) when or at a certain time before a certain, e.g., predefined, time period, after the base station stopped providing resource allocation configuration or assistance, elapsed, and/or
(e) when or at a certain time before a certain, e.g., predefined, validity period for currently used set of group resources elapses, and/or
(f) when or at a certain time before a certain location is reached by the apparatus of by the group of UEs, e.g., based on the location of the group, i.e. if the UE moves from one zone to another zone.

The validity period is based on a fixed time period or on a counter based on a number of times the apparatus send announcements. The apparatus is configured to carry out a reselection of resources and announce a new set of group resources to all groupcast UEs at a certain time before the validity period lapses so that the group UEs shift from the current set of group resources to the new set of group resources when the validity period lapsed.

In other embodiments, a wireless communication system includes one or more base stations and a plurality of user devices, UEs, wherein the apparatus is configured to be connected to one or more UEs via a sidelink for a sidelink communication with the one or more UEs, the apparatus and the one or more UEs forming a group of UEs and using a set of group resources to be used for the sidelink communication within the group of UEs, wherein one of the UEs is a leader UE, and in case the base station does not provide resource allocation configuration or assistance, the apparatus is configured to send to the leader UE a demand for resources to be used by the apparatus for the sidelink communication within the group of UEs, and receive from the leader UE a set of group resources exclusively sensed/selected by the leader UE from set of resources, the set of group resources to be used for the sidelink communication within the group of UEs.

In other embodiments, a wireless communication system includes one or more base stations and a plurality of user devices, UEs, wherein the apparatus is configured to be connected to one or more UEs via a sidelink for a sidelink communication with the one or more UEs, the apparatus and the one or more UEs forming a group of UEs, and wherein the apparatus is configured to establish respective links within the group of UEs using the RRC protocol on the sidelink. The apparatus is configured to signal one or more RRC messages to the UEs, the one or more messages including for example one or more of a paging message, connection setup messages, reconfiguration messages, measurement reports, connection re-establishment messages, connection release messages.

In embodiments, the set of resources include a plurality of groups of resources, the plurality of groups of resources including at least a first group of resources having a first numerology and a second group of resources having a second numerology, the first and second numerologies being different. The set of resources comprises a plurality of contiguous or non-contiguous resources across a frequency domain and adjacent or non-adjacent across a time domain.

In certain embodiments, the apparatus comprises one or more of a mobile terminal, or stationary terminal, or cellular IoT-UE, or vehicular UE, or an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator.

Further, embodiments of the invention include one or more base stations, and one or more apparatus of any one of the embodiments described herein. The base station, wherein the base station comprises one or more of a macro cell base station, or a small cell base station, or a central unit of a base station, or a distributed unit of a base station, or a road side unit, or a UE, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

Other embodiments include methods for operating an apparatus of a wireless communication system having one or more base stations and a plurality of user devices, UEs, the apparatus connected to one or more UEs via a sidelink for a sidelink communication with the one or more UEs, the apparatus and the one or more UEs forming a group of UEs and using a set of group resources to be used for the sidelink communication within the group of UEs, the method comprising: in case a base station does not provide resource allocation configuration or assistance, selecting, by the apparatus, resources from a set of resources provided by the wireless communication system so as to alter or completely change the set of group resources to be used for the sidelink communication within the group of UEs.

Other embodiments include a method for operating an apparatus of a wireless communication system having one or more base stations and a plurality of user devices, UEs, the apparatus connected to one or more UEs via a sidelink for a sidelink communication with the one or more UEs, the apparatus and the one or more UEs forming a group of UEs and using a set of group resources to be used for the sidelink communication within the group of UEs, wherein one of the UEs is a leader UE, the method comprising: in case the base station does not provide resource allocation configuration or assistance, sending to the leader UE a demand for resources to be used by the apparatus for the sidelink communication within the group of UEs, and receiving from the leader UE a set of group resources exclusively sensed/selected by the leader UE from set of resources, the set of group resources to be used for the sidelink communication within the group of UEs.

Other embodiments include methods for operating an apparatus of a wireless communication system having one or more base stations and a plurality of user devices, UEs, the apparatus connected to one or more UEs via a sidelink for a sidelink communication with the one or more UEs, the apparatus and the one or more UEs forming a group of UEs, the method comprising: establishing, by the apparatus, respective links within the group of UEs using the RRC protocol on the sidelink.

Further, non-transitory computer program product comprising a computer readable medium storing instructions which, when executed on a computer, perform the methods described herein.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

| LIST OF ACRONYMS AND SYMBOLS | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |
| mRP | Mini Resource Pool |

The invention claimed is:

1. An apparatus for a wireless communication system, the wireless communication system comprising one or more base stations and a plurality of user devices, UEs,
   wherein the apparatus is configured to be connected to one or more UEs via a sidelink for a sidelink communication with the one or more UEs, the apparatus and the one or more UEs forming a group of UEs and using a set of group resources to be used for the sidelink communication within the group of UEs,
   wherein, in case a base station does not provide resource allocation configuration or assistance, the apparatus is configured to select resources from a set of resources provided by the wireless communication system so as to alter or completely change the set of group resources to be used for the sidelink communication within the group of UEs,
   wherein, to select from the set of resources the resources to be used for the sidelink communication within the group of UEs, the apparatus is configured to carry out a sensing procedure or listening to announcements indicative of resources used by other UEs,
   wherein the one or more UEs forming with the apparatus the group of UEs do not sense or select resources for the sidelink communication within the group of UEs but receive information about the resources for the sidelink communication from the apparatus, and wherein the apparatus is configured to announce the sensed or selected resources for the sidelink communication to all group UEs.

2. The apparatus of claim 1, wherein, in case the base station does not provide resource allocation configuration or assistance, the apparatus is configured to
decide on the amount of resources needed for the group of UEs, and
select from the set of resources the resources to be used for the sidelink communication within the group of UEs.

3. The apparatus of claim 2, wherein, to decide on the amount of resources needed for the group of UEs, the apparatus is configured to perform one or more of the following:
receive from one or more of the UEs of the group of UEs one or more demands for resources to be used for the sidelink communication within the group of UEs, and decide on the amount of resources needed for the group of UEs based on the received one or more demands,
acquire the amount of resources needed for the group of UEs from an application,
estimate the amount of resources needed for the group of UEs.

4. The apparatus of claim 1, wherein the apparatus is configured to exclusively sense or select the set of group resources from the set of resources.

5. The apparatus of claim 1, wherein the apparatus is configured to establish respective links within the group of UEs using
the sidelink protocol, or
the RRC protocol on the sidelink.

6. The apparatus of claim 5, wherein, when using the RRC protocol on the sidelink, the apparatus is configured to perform one or more of the following:
send to the one or more UEs control messages in a configurable manner,
receive the resource demands from the UEs using the RRC signaling,
select and allocate resources dynamically and semi-statically to the UEs.

7. The apparatus of claim 1, wherein, to announce the sensed or selected resources to all group UEs, the apparatus is configured to send a message broadcasting information identifying the sensed or selected set of group resources to be used for the sidelink communication within the group of UEs, the message being send on the group resources or on other resources from the set of resources provided by the wireless communication system.

8. The apparatus of claim 1, wherein the apparatus is configured to announce the sensed or selected resources to all group UEs in one or more of the following ways:
in the form of a field within a SCI transmitted by the apparatus to UEs of the group,
via a sidelink paging signal to all UEs in the vicinity,
using the ProSe Direct Discovery mechanism.

9. The apparatus of claim 1, wherein the apparatus is configured to announce the sensed or selected or reserved resources to all group UEs
inform all UEs of the group about the set of group resources to be used for the sidelink communications within the group, and
inform one or more other groups of UEs that the selected set of group resources are currently used by the group of UEs.

10. The apparatus of claim 1, wherein the content of the announcement comprises time-frequency information of the sensed or selected set of group resources, the set of group resources defining a resource pool, a mini-resource pool, a band width part, BWP, in a resource pool, or a resource pool in a BWP.

11. The apparatus of claim 10, wherein the apparatus is configured to announce the sensed or selected resources to all group UEs repeatedly.

12. The apparatus of claim 1, wherein the apparatus is configured to announce the sensed or selected or reserved resources to all group UEs in an event-triggered manner.

13. A wireless communication network, comprising:
one or more base stations, and
one or more apparatuses for a wireless communication system, the wireless communication system comprising one or more base stations and a plurality of user devices, UEs,
wherein the apparatus is configured to be connected to one or more UEs via a sidelink for a sidelink communication with the one or more UEs, the apparatus and the one or more UEs forming a group of UEs and using a set of group resources to be used for the sidelink communication within the group of UEs,
wherein, in case a base station does not provide resource allocation configuration or assistance, the apparatus is configured to select resources from a set of resources provided by the wireless communication system so as to alter or completely change the set of group resources to be used for the sidelink communication within the group of UEs,
wherein, to select from the set of resources the resources to be used for the sidelink communication within the group of UEs, the apparatus is configured to carry out a sensing procedure and or listening to announcements indicative of resources used by other UEs,
wherein the one or more UEs forming with the apparatus the group of UEs do not sense or select resources for the sidelink communication within the group of UEs but receive information about the resources for the sidelink communication from the apparatus, and
wherein the apparatus is configured to announce the sensed or selected resources for the sidelink communication to all group UEs.

14. The wireless communication network of claim 13, wherein
the apparatus is a leader UE of the group formed by the apparatus and the one or more UEs, and
wherein in case the base station does not provide resource allocation configuration or assistance, the one or more UEs are configured to
send to the leader UE a demand for resources to be used by the apparatus for the sidelink communication within the group of UEs, and
receive from the leader UE a set of group resources exclusively sensed or selected by the leader UE from set of resources, the set of group resources to be used for the sidelink communication within the group of UEs.

15. A method for operating an apparatus of a wireless communication system comprising one or more base stations and a plurality of user devices, UEs, the apparatus connected to one or more UEs via a sidelink for a sidelink communication with the one or more UEs, the apparatus and the one or more UEs forming a group of UEs and using a set of group resources to be used for the sidelink communication within the group of UEs, the method comprising:

in case a base station does not provide resource allocation configuration or assistance, selecting, by the apparatus, resources from a set of resources provided by the wireless communication system so as to alter or completely change the set of group resources to be used for the sidelink communication within the group of UEs, wherein, for selecting from the set of resources the resources to be used for the sidelink communication within the group of UEs, carrying out, by the apparatus, a sensing procedure or listening, by the apparatus, to announcements indicative of resources used by other UEs, wherein the one or more UEs forming with the apparatus the group of UEs do not sense or select resources for the sidelink communication within the group of UEs but receive information about the resources for the sidelink communication from the apparatus, and wherein the apparatus announces the sensed or selected resources for the sidelink communication to all group UEs.

16. A non-transitory digital storage medium having a computer program stored thereon to perform, when said computer program is run by a computer, a method for operating an apparatus of a wireless communication system comprising one or more base stations and a plurality of user devices, UEs, the apparatus connected to one or more UEs via a sidelink for a sidelink communication with the one or more UEs, the apparatus and the one or more UEs forming a group of UEs and using a set of group resources to be used for the sidelink communication within the group of UEs, the method comprising:

in case a base station does not provide resource allocation configuration or assistance, selecting, by the apparatus, resources from a set of resources provided by the wireless communication system so as to alter or completely change the set of group resources to be used for the sidelink communication within the group of UEs, wherein, for selecting from the set of resources the resources to be used for the sidelink communication within the group of UEs, carrying out, by the apparatus, a sensing procedure or listening, by the apparatus, to announcements indicative of resources used by other UEs, wherein the one or more UEs forming with the apparatus the group of UEs do not sense or select for the sidelink communication within the group of UEs but receive information about the resources for the sidelink communication from the apparatus, and wherein the apparatus announces the sensed or selected resources for the sidelink communication to all group UEs.

* * * * *